United States Patent
Honda et al.

(10) Patent No.: US 7,492,819 B2
(45) Date of Patent: Feb. 17, 2009

(54) VIDEO CODING APPARATUS

(75) Inventors: Yoshimasa Honda, Kamakura (JP); Tsutomu Uenoyama, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1139 days.

(21) Appl. No.: 10/324,807

(22) Filed: Dec. 20, 2002

(65) Prior Publication Data

US 2003/0118100 A1    Jun. 26, 2003

(30) Foreign Application Priority Data

Dec. 25, 2001    (JP)    ............ P 2001-391602

(51) Int. Cl.
H04B 1/66    (2006.01)

(52) U.S. Cl. ............ 375/240.03; 375/240.05; 375/240.07; 375/240.13; 375/240.29; 375/240.24; 375/240.02; 382/251; 382/239; 382/264

(58) Field of Classification Search ............ 375/240.03, 375/240.05, 240.07, 240.13, 240.08, 240.26, 375/240.29, 240.24, 240.02; 382/239, 251, 382/243, 232, 264

See application file for complete search history.

(56) References Cited

U.S. PATENT DOCUMENTS

| | | | | |
|---|---|---|---|---|
| 5,038,389 A | * | 8/1991 | Mizuno | 382/248 |
| 5,475,433 A | * | 12/1995 | Jeong | 375/240.05 |
| 5,815,601 A | * | 9/1998 | Katata et al. | 382/232 |
| 6,078,689 A | * | 6/2000 | Kunitake et al. | 382/232 |
| 6,236,756 B1 | * | 5/2001 | Kimura et al. | 382/239 |
| 6,907,069 B2 | * | 6/2005 | Matsuzaki et al. | 375/240.12 |
| 6,954,503 B1 | * | 10/2005 | Nogaki | 375/240.26 |

FOREIGN PATENT DOCUMENTS

| | | |
|---|---|---|
| JP | 4-219089 | 8/1992 |
| JP | 8-46857 | 2/1996 |
| JP | 8-256337 | 10/1996 |
| JP | 10-23432 | 1/1998 |
| JP | 11-215498 | 8/1999 |
| JP | 2001-275114 | 10/2001 |

OTHER PUBLICATIONS

Japanese Office Action dated Jul. 4, 2007.

* cited by examiner

*Primary Examiner*—Shawn An
(74) *Attorney, Agent, or Firm*—Pearne & Gordon LLP

(57) ABSTRACT

In order to enhance the picture quality of a detected area, the present invention provides a video coding apparatus. In the apparatus, a reliability indicative of the degree of coincidence of an area detected by an important area detecting section with a real important area is calculated, and a coding parameter calculating section calculates a coding parameter to be set to the detected area according to the reliability, thereby controlling the picture quality of the detected area. Consequently, a whole image has a coding bit amount which does not break the restrictions of a transmission bit rate, and a larger coding bit amount is assigned to the important area so that a picture quality thereof can be improved and a visibility can be enhanced. In addition, the picture quality is more enhanced if a probability that the detected area might be an important area is higher.

11 Claims, 8 Drawing Sheets

VIDEO CODING APPARATUS

BACKGROUND OF THE INVENTION

1. Field of the Invention

The present invention relates to a video coding apparatus for coding a video signal in a transmission bit rate limited based on a coding parameter.

2. Description of the Related Art

In recent years, a video signal can be transmitted and received through a transmission path and can be stored in storage media because of the development of communication technology and an improvement in an infrastructure. In general, the video signal has a large information amount. In the case in which the video signal is to be transmitted by using a transmission path having a limited transmission bit rate or the video signal is to be stored in storage media having a limited storage capacity, therefore, a technique for compressing and coding a video signal is indispensable. As one of methods of compressing and coding a video signal, there has been proposed an MPEG (Moving Picture Expert Group) in which ISO/IEC progresses a standardization, which is a technique for reducing a redundancy utilizing the time correlation and spatial correlation of a video signal, thereby decreasing the information amount of the video signal and carrying out coding to obtain a video signal satisfying a bit rate of a transmission path or a bit rate for recording in storage media.

In the compression and coding of the video signal, the video signal is coded to have a limited bit rate. For this reason, a coding bit amount to be assigned to one image constituting a video is restricted and the picture quality of the image is deteriorated according to a transmission bit rate. In particular, in the case in which the inside of a screen is to be coded uniformly, the picture quality becomes uniform in the screen, that is, a deterioration in the picture quality also becomes uniform.

For example, video coding in a TV conference will be considered. If a user uniformly codes the inside of the screen although he (she) originally desires that the picture quality of a face portion should be more excellent than that of a background portion, the picture quality of the face portion which is important for the TV conference becomes equivalent to that of the background portion which is not important. Consequently, a video obtained after the coding does not satisfy a subjective picture quality which reflects the user's intention.

In the screen, there are present an important area for the user and an area which is not important. The user desires that the important area should have a high visibility. Subsequently, the important area for the user is defined to be an "important area", and a face portion that the user wants to see in the TV conference is set to be the important area, for example.

As a technique capable of carrying out coding to reflect the user's intension, there has been proposed a method of setting the picture quality of an important area to be more excellent than that of another area. For example, in a method described in ISO/IEC JTC1/SC29/WG11 MPEG95/030, an important area is selected from a dynamic image and a quantization value is changed to set the picture quality of the important area to be more excellent than that of another area.

In this method, moreover, the selected area is set to have a high picture quality. In the case in which the important area moves over the screen, therefore, it is necessary to select the important area at any time in order to maintain the picture quality of the important area to be high. Therefore, there can be supposed a method of setting a detected important area to have a high picture quality by utilizing detecting means for automatically detecting the important area.

Examples of this method include an image compressing and coding apparatus (hereinafter referred to as a conventional example) described in JP-A-10-23432. In the conventional example, a prestored pattern and an input image are matched to give a high picture quality to an area which is coincident with the pattern.

A method according to the conventional example will be described below. FIG. 8 is a block diagram showing the conventional example. In FIG. 8, a compressing and coding apparatus 5001 is constituted to have a motion estimating section 5002, a DCT (Discrete Cosine Transform) section 5003, a quantizing section 5004, a variable-length coding section 5005, a header adding section 5006, a decoding section 5007, a priority coding specifying section 5008, a code amount comparing section 5009 and a coding parameter determining section 5010.

Description will be given to the operation of the compressing and coding apparatus having the structure described above. An input image is coded on a macro block unit constituted by 16×16 pixels. The motion estimating section 5002 compares the similarities of a reference image and an input image which are output from the decoding section 5007 which will be described below, thereby calculating a differential value from an area having a high similarity. The output of the motion estimating section 5002 has two modes. The two modes include a mode 1 for outputting the differential value and a mode 2 for exactly outputting an input. These modes are determined by the coding parameter determining section 5010 which will be described below.

The DCT section 5003 orthogonally transforms an image output from the motion estimating section 5002 and outputs the result of the transformation to the quantizing section 5004. The quantizing section 5004 divides an orthogonal transformation coefficient output from the DCT section 5003 by a quantization value output from the coding parameter determining section 5010 which will be described below, and outputs a result to the variable-length coding section 5005. The variable-length coding section 5005 variable-length codes the result of quantization which is output from the quantizing section 5004, and outputs the variable-length coded result to the header adding section 5006.

The header adding section 5006 adds a necessary header to a code output from the variable-length coding section 5005 and outputs a coded video signal to the decoding section 5007 and the outside, and outputs the generated code amount to the code amount comparing section 5009. The decoding section 5007 decodes the coded video signal output from the header adding section 5006, and outputs a reference image to the motion estimating section 5002. The code amount comparing section 5009 compares a predetermined target code amount with the generated code amount output from the header adding section 5006, and outputs a remainder code amount to be the difference to the coding parameter determining section 5010.

The priority coding specifying section 5008 compares a prestored pattern with a similarity to the input image. If a degree of coincidence is equal to or more than a certain threshold, an instruction for priority coding is output to the coding parameter determining section 5010. The coding parameter determining section 5010 determines a quantization value and a motion estimating mode by using the remainder code amount output from the code amount comparing section 5009, outputs the quantization value to the quantizing section 5004 and outputs the motion estimating mode to the motion estimating section 5002.

For example, if the remainder code amount is small, the mode 1 using a differential value is set or the quantization value is increased to decrease the generated code amount. To the contrary, if the remainder code amount is large, the mode 2 using an input image is set or the quantization value is decreased to increase the generated code amount. In the case in which the instruction for priority coding is output from the priority coding specifying section 5008, the mode 2 using an input image is set or the quantization value is decreased to carry out control such that a large code amount is assigned to a macro block to which the instruction for priority coding is given. Thus, it is possible to enhance a picture quality by assigning a large code amount to the macro block to which the instruction for priority coding is given.

However, precision in the detection of an important area is not always 100%. For this reason, the detected area is not completely coincident with a real important area and is shifted from the real area or completely gets out of the real area in some cases. In these cases, a picture quality in the detected area is enhanced, resulting in a reduction in the visibility of the real important area which gets out of the detected area.

Moreover, the priority coding specifying section 5008 detects an area which is coincident with the important area by a certain threshold or more and carries out a constant enhancement in the picture quality irrespective of the degree of the coincidence with the important area. Therefore, the effects of the enhancement in the picture quality are committed to threshold setting. For example, in the case in which the threshold is small, a constant enhancement in the picture quality is carried out even in an image having a low degree of coincidence, that is, an area having a low probability of the important area so that the code amount is used wastefully. For this reason, it is impossible to assign a large code amount to the important area in which a picture quality is to be originally enhanced, thereby improving the picture quality.

To the contrary, in the case in which the threshold is great, a constant enhancement in a picture quality is carried out only for an image which is completely coincident with a pattern, resulting in a reduction in a probability that the picture quality of the important area will be enhanced. On the other hand, a picture quality is deteriorated in an important area which has a high probability of the important area and does not satisfy the threshold.

If a constant enhancement in the picture quality is carried out for only the area having the degree of the coincidence with the important area which is equal to or higher than the threshold irrespective of the degree of the coincidence, an enhancement in the picture quality cannot be performed according to the degree of the coincidence and the visibility of the important area is deteriorated in some cases. The enhancement in the picture quality according to the degree of the coincidence implies that the picture quality is more enhanced with an increase in the degree of the coincidence with the important area.

In this specification, hereinafter, a degree of coincidence of the detected area with the real important area is defined to be a "reliability" and a high reliability implies that a probability of the detected area to be the real important area is high, that is, precision in detection is high.

SUMMARY OF THE INVENTION

The invention has been made to solve the conventional problems and has an object to provide a video coding apparatus wherein the picture quality of a detected area can be enhanced in the case in which this area is an original important area, and furthermore, the picture quality of the important area can be maintained to some extent also in the case in which the detected area does not include the original important area, thereby ensuring a visibility without breaking restrictions for coding a video signal in a limited transmission bit rate.

The present invention provides a video coding apparatus for coding a video signal based on a coding parameter for setting a coding bit amount, the apparatus including important area detecting means for detecting, as an important area, a specific area in a displayed image by the video signal for which a preset high visibility is required; and coding parameter calculating means for calculating a coding parameter in the area detected by the important area detecting means; wherein the important area detecting means calculates a reliability indicative of precision in a detection result of the specific area and calculates a coding parameter of the detected area depending on a value of the reliability which is calculated by the important area detecting means.

According to the invention, an important area in the screen is automatically selected and the coding parameter of the automatically selected important area is changed to set a coding bit amount to be larger than that in another area, for example. Thereby, for example, it is possible to enhance the picture quality of the selected area.

Further, in the video coding apparatus, a coding parameter on an outside of a detected area is calculated such that a value is gradated as growing away from the detected area from the coding parameter of the detected area as depending on the value of the reliability.

According to the invention, the coding parameter of a portion which is not detected to be the important area is also set stepwise. Even if the detection error of the important area is made, therefore, the setting is carried out such that the picture quality of the area is not deteriorated extremely. Moreover, the coding parameter of the detected area is set according to the reliability of the detection. In the case of the important area having a high reliability, for example, such a coding parameter as to enhance the picture quality is set so as to sequentially deteriorate a picture quality in an area which has a low reliability and is not the important area.

The present invention also provides the video coding apparatus, wherein the coding parameter calculating means greatly controls a degree of a decrease in a quantization value of the area detected by the important area detecting means if a reliability of important area detection of the important area detecting means is high, and slightly controls the degree of the decrease in the quantization value of the detected area if the reliability is low, thereby calculating a quantization value as a coding parameter.

According to the invention, in an area having a higher possibility of the important area, a quantization value to be a coding parameter is decreased and a larger code amount is assigned to an area detected by the important area detecting means. Consequently, the picture quality of the detected area can be enhanced. Namely, a deterioration in a screen in an area having a higher reliability and a higher probability of an important area is reduced more considerably to enhance a picture quality depending on a detection reliability. Moreover, the degree of the reduction in the deterioration in the screen is more decreased in an area having a lower reliability and a lower probability of the important area. Also in the case in which a detection result is deviated from a real important area, consequently, it is possible to prevent the picture quality of a detection error portion from being extremely deteriorated in the real important area.

The present invention further provides, the video coding apparatus, wherein the coding parameter calculating means greatly controls a degree of an increase in a screen update rate of the area detected by the important area detecting means if a reliability of important area detection of the important area detecting means is high, and slightly controls the degree of the increase in the screen update rate of the detected area if the reliability is low, thereby calculating the screen update rate as a coding parameter.

According to the invention, in an area having a higher reliability and a higher probability of the important area, the coding is carried out such that a screen update rate is set to be higher and the motion of the important area is carried out smoothly. To the contrary, in an area having a lower reliability and a lower probability of the important area, the degree of an increase in a screen update rate is sequentially reduced to prevent the smoothness of the motion from being extremely deteriorated in the detection error portion of the real important area also in the case in which the detection result is deviated from the real important area.

The present invention provides the video coding apparatus, wherein the coding parameter calculating means greatly controls a degree of an increase in a frame skipping threshold of the area detected by the important area detecting means if a reliability of important area detection of the important area detecting means is high, and slightly controls the degree of the increase in the frame skipping threshold of the detected area if the reliability is low, thereby calculating the frame skipping threshold as a coding parameter.

According to the invention, in an area having a higher reliability and a high probability of the important area, the coding is carried out to prevent a coding skip so as to maintain the smoothness of the motion also when a band is insufficient in the coding. Moreover, in an area having a lower reliability and a lower probability of the important area, the coding skip is more carried out than that in the case of a high reliability. Also in the case in which the band is insufficient and the detection result is deviated from the real important area, thus, the smoothness of the motion in the detection error portion of the real important area can be prevented from being extremely deteriorated. Namely, according to the invention, in an area having a higher possibility of the important area, a frame skipping threshold to be a coding parameter is more increased and a larger code amount is assigned to an area detected by the important area detecting means. Consequently, the picture quality of the detected area can be enhanced.

The present invention further provides the video coding apparatus, wherein the coding parameter calculating means sets a prefilter other than the area detected by the important area detecting means to be a low pass filter having a high cut-off frequency if a reliability of important area detection by the important area calculating means is high, and sets the prefilter other than the detected area to be a low pass filter having a low cut-off frequency if the reliability is low, thereby calculating, as a coding parameter, a prefilter for removing a high frequency component of the video signal.

According to the invention, in an area having a higher possibility of the important area, a stronger low pass filter is provided for the outside of the detected area to reduce high frequency information and to save the code amount, thereby assigning a larger code amount to the detected area, resulting in an enhancement in a picture quality. Also in the case in which a reliability is low and the detected area is shifted from a real important area, moreover, a prefilter corresponding to the reliability is set. Therefore, the setting can be prevented from being carried out such that the coding bit amount of a detection error area in the real important area is extremely decreased.

The present invention also provides the video coding apparatus further including preprocessing means, wherein the coding parameter calculating means setting, as a detected area, an area cut out of an image displayed by the video signal if a reliability of important area detection by the important area detecting means is high, and sets an area to be cut out as a large area including surroundings of the detected area if the reliability is low, thereby calculating, as a coding parameter, a cutout size of the area to be cut out, and wherein the preprocessing means cutting out a specific area of the image displayed by the video signal or adjusting a cutout area in the displayed image based on the cutout size calculated as the coding parameter.

According to the invention, the important area is automatically cut out and a size thereof is automatically adjusted properly, for example, so as to be seen easily, and the cutout area which is thus adjusted automatically is coded such that a picture quality is higher than that in another area. Moreover, in an area having a higher possibility of the important area, a cutout size to be a coding parameter is reduced and a larger code amount is assigned to an area detected by the important area detecting means. Consequently, the picture quality of the detected area can be enhanced.

Additionally, according to the invention, when a reliability is higher and a probability of the important area is higher, the important area is cut out faithfully, and is more enlarged and coded. Also in the case in which the reliability is low and precision in the detection of the important area is low, an area including the surroundings of the detected area is cut out. Therefore, the detection error portion in the real important area can be prevented from being protruded from the cutout area and the important area is cut out, enlarged and coded.

The present invention further provides the video coding apparatus, wherein the coding parameter calculating means sets a degree of size correction of the area detected by the important area detecting means to be low if a reliability of important area detection by the important area detecting means is high, and sets the degree of the size correction of the detected area to be high if the reliability is low, thereby calculating, as a coding parameter, an area correcting parameter for changing a size of the detected area.

According to the invention, in an area having a higher possibility of the important area, an area detected by the important area detecting means is enlarged and corrected based on an area correcting parameter to be a coding parameter and a larger code amount is assigned to the detected area. Consequently, the picture quality of the detected area can be enhanced.

Additionally, according to the invention, the picture quality of the area including the surroundings of the detected area is enhanced. Also in the case in which the precision in the detection of the important area is low and the real important area is shifted from the detected area, therefore, the picture quality of the area including the important area is enhanced.

The present invention provides the video coding apparatus, wherein the coding parameter calculating means sets a degree of size correction of the area detected by the important area detecting means to be low if a reliability of important area detection by the important area detecting means is high, and sets the degree of the size correction of the detected area to be high if the reliability is low, thereby calculating, as a coding parameter, an area correcting parameter for changing a size of the detected area.

According to the invention, in an area having a higher reliability and a higher probability of the important area, a picture quality is enhanced and cutout and enlargement are carried out to improve a visibility. In the case in which the reliability is low, the probability of the important area is low and the detected area is shifted from the real important area, moreover, only an enhancement in the picture quality is carried out and the detection error portion in the real important area can be prevented from being protruded from the cutout area due to the cutout.

The present invention also provides the video coding apparatus, wherein the coding parameter calculating means sets a coding mode of the area detected by the important area detecting means into picture priority if a size of a specific area detected by the important area detecting means is large, and sets the coding mode of the detected area into motion priority if the size of the specific area is small, thereby calculating the coding mode as a coding parameter.

According to the invention, in the case in which the important area has a motion, a coding mode is set into motion priority. In the case in which the important area has no motion, the coding mode is set into picture quality priority. Thus, the important area having the motion is smoothly moved and the picture quality of the important area having no motion is enhanced. Namely, according to the invention, in the case in which the important area is small and a deterioration in the picture quality is less remarkable depending on the size of the important area, the motion has priority over the picture quality and the coding is carried out such that the motion is smoothly performed. In the case in which the important area is large and the deterioration in the picture quality is more remarkable, moreover, the picture quality has priority over the motion and the coding is carried out such that a suitable visibility for the size of the important area is maintained to be high.

Furthermore, the present invention provides a program for causing a computer to execute coding of a video signal based on a coding parameter setting a coding bit amount, the computer being caused to function as:

(1) important area detecting means for detecting, as an important area, a preset specific area in a display image by the video signal for which a high visibility is required, and calculating a reliability indicative of precision in a detection result of the specific area; and (2) coding parameter calculating means for calculating a coding parameter of the detected area corresponding to a value of the reliability thus calculated.

Figure 1:
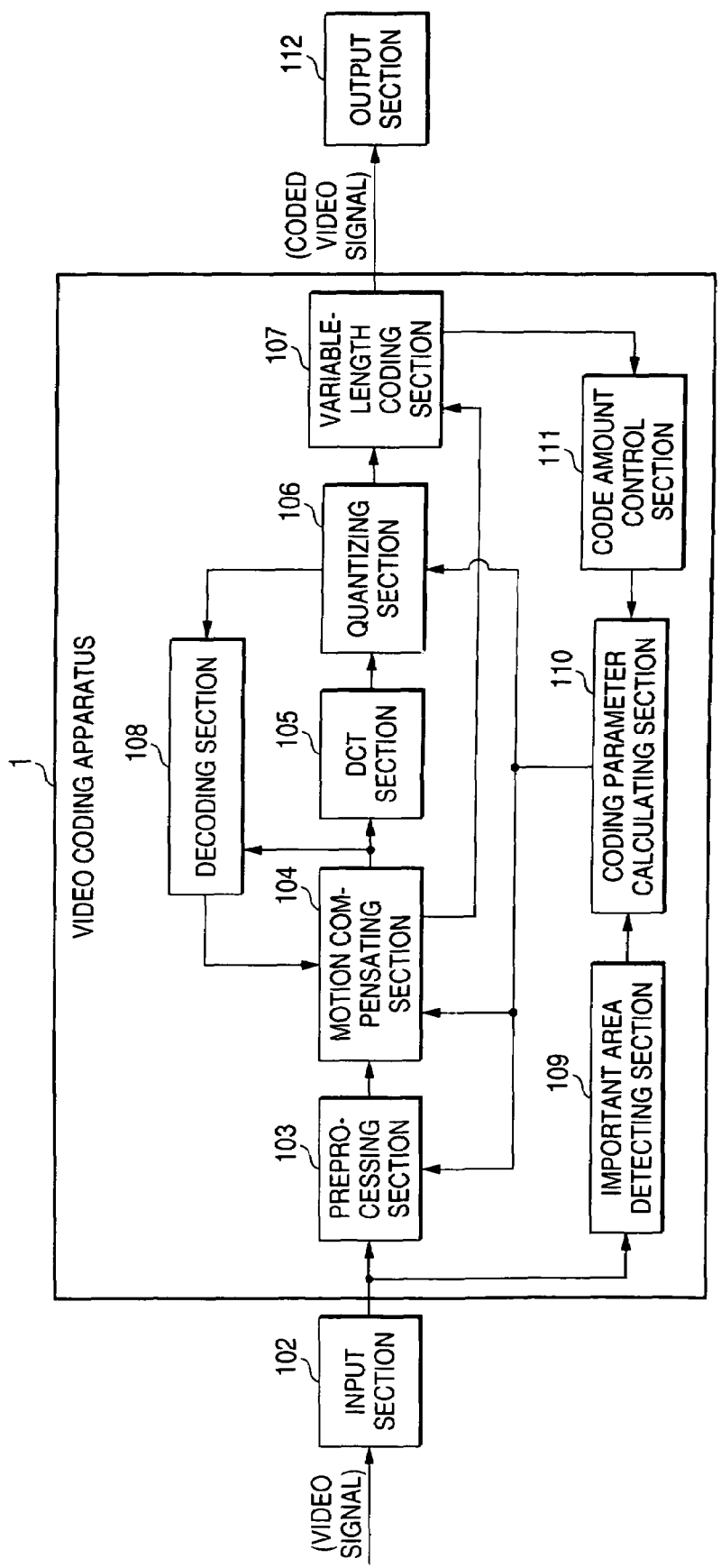
FIG. 1 is a block diagram showing an example of a structure according to a first embodiment of a video coding apparatus according to the invention.

In the figures, a reference numeral 1 refers to a video coding apparatus; 102 to an input section; 103 to a preprocessing section; 104 to a motion compensating section; 105 to a DCT section; 106 to a quantizing section; 107 to a variable-length coding section; 108 to a decoding section; 109 to an important area detecting section; 110 to a coding parameter calculating section; 111 to a code amount control section; 401 to an area dividing map; 402 to a small block; 601 to a reduced image 1; 602 to a reduced image 2; 603 to a reduced image 3; 701 to an important area; 702 to a cutout area; and 710 to an input image.

DETAILED DESCRIPTION OF THE PREFERRED EMBODIMENTS

An embodiment of the invention will be described below with reference to the drawings.

First Embodiment

FIG. 1 is a block diagram showing a structure according to a first embodiment of a video coding apparatus of the invention. The video coding apparatus 1 according to the embodiment is constituted to have a preprocessing section 103 for carrying out a prefilter processing for an input video and a preprocessing to cut out a video on a small block unit, a motion compensating section 104 having three kinds of operation modes for predicting and compensating the motion of a video input from the preprocessing section 103, a DCT section 105 for orthogonally transforming (discrete cosine transforming) a differential value output which is input from the motion compensating section 104 or a video signal itself, a quantizing section 106 for carrying out a processing of quantizing data in a frequency area transformed orthogonally by the DCT section 105, a variable-length coding section 107 for carrying out variable-length coding to assign a code having a different length corresponding to the occurrence probability of a value at the same time that the data quantized by the quantizing section 106 are run-length length coded, a decoding section 108 for decoding the data quantized by the quantizing section 106, an important area detecting section 109 for detecting an important area in which a visibility in an input video is enhanced, a coding parameter calculating section 110 for determining the motion compensating mode of the motion compensating section 104 and a quantization coefficient in the quantizing section 106, and a code amount control section 111 for controlling the code amount of the variable-length coding section 107 through the coding parameter calculating section 110 based on a shift of the target value of the code amount from an actual accumulated value, and an input section 102 for inputting a video signal to the preprocessing section 103 and the important area detecting section 109 is connected to an output section 112 for outputting a coding video signal generated in the variable-length coding section 107. The video coding apparatus 1 serves to code a video signal in a determined transmission bit rate.

Figure 2:
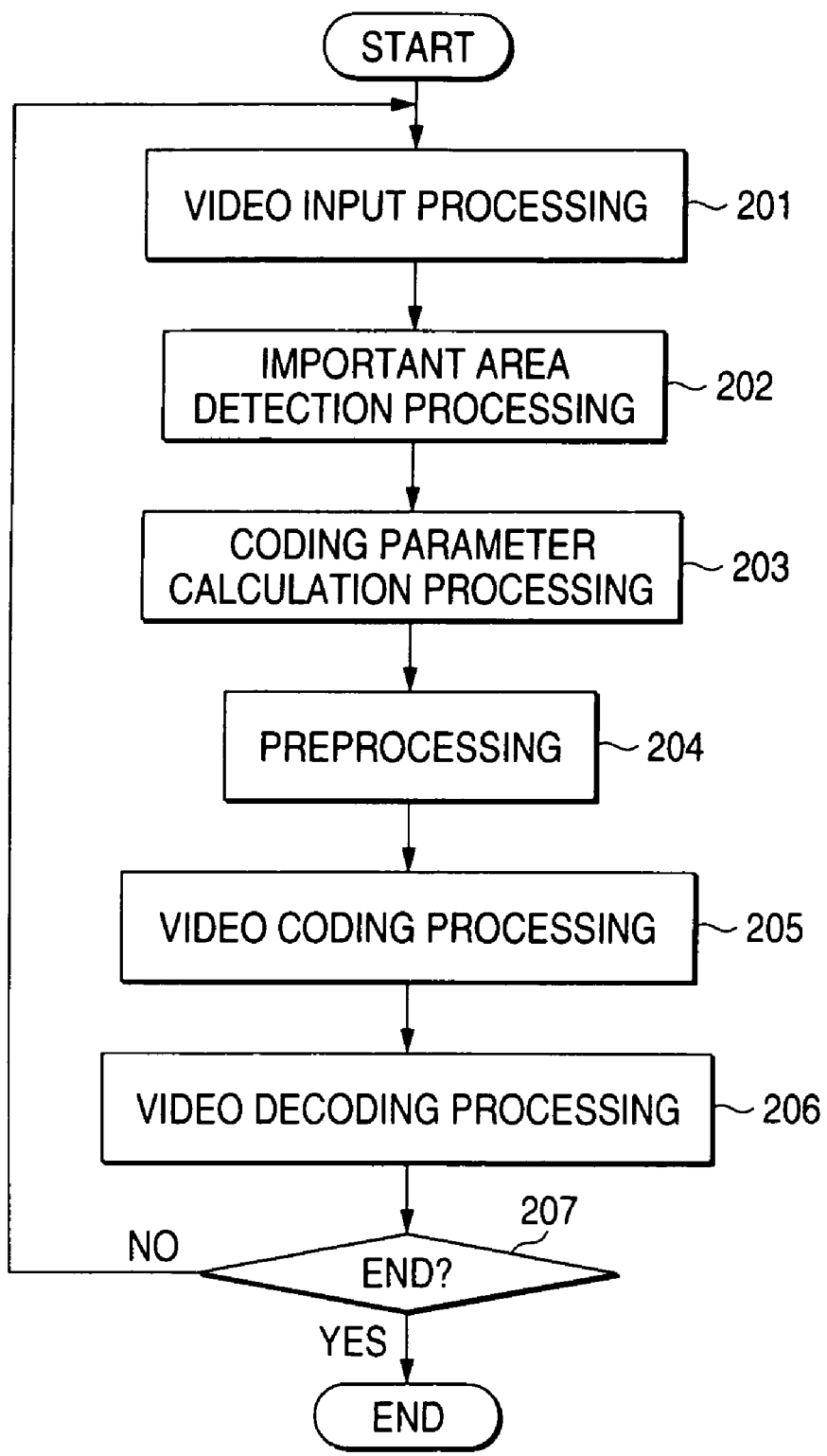
FIG. 2 is a flow chart showing a flow of a video coding processing according to the first embodiment of the invention.

FIG. 2 is a flow chart showing a flow of a processing for a video signal in the video coding apparatus 1. The video coding apparatus 1 sequentially executes a video input processing of inputting a video signal in a step 201, an important area detection processing of detecting an important area in a step 202, a coding parameter calculation processing of calculating a coding parameter in a step 203, a preprocessing of preprocessing an input image in a step 204, a video coding processing of coding a video signal in a step 205, a video decoding processing of decoding the decoded video signal in a step 206, and an end decision processing in a step 207, and the processings of the steps 201 to 207 are repeated until the processing is decided to be ended.

Next, an operation according to the embodiment will be described. In the processing of inputting a video in the step 201, first of all, the input section 102 detects a synchronous signal from a video signal and outputs an image constituting the video signal to the preprocessing section 103 and the important area detecting section 109 for one screen. In the important area detection processing in the step 202, next, the important area detecting section 109 detects an area having a high correlation between image data for one screen input from the input section 102 and prestored image data such as an average face image, for example. By setting an area having the highest correlation to be an important area, then, a result of the detection and a reliability (Reliability) to be a correlation value are output to the coding parameter calculating section 110.

Figure 3:
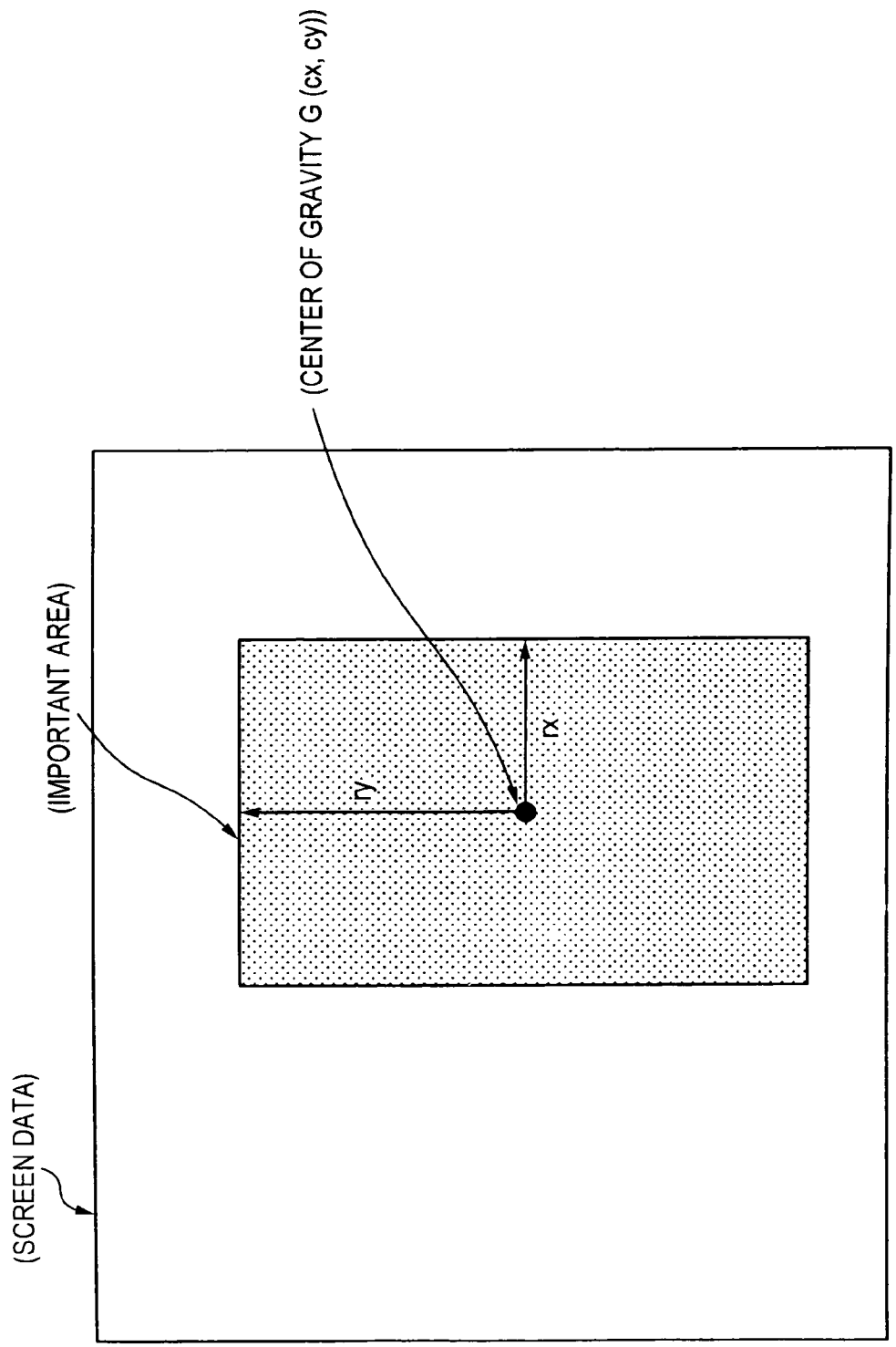
FIG. 3 is a diagram showing an example of the result of detection of an important area according to the first embodiment of the invention.

FIG. 3 is a diagram showing an example of the result of the detection of the important area detecting section 109. For example, in the case in which a rectangular area is output as the result of the detection, four values including coordinates (cx, cy) of a center of gravity in the important area and a radius (rx, ry) in horizontal and vertical directions from the center of gravity are output. A method of outputting the result of the detection in the important area detecting section 109 is not restricted thereto but any output method capable of specifying an area can also be used. A method of detecting the important area is not restricted to the use of a correlation value between the images. It is also possible to use any method capable of calculating area detection and a reliability representing precision in the detection.

In the coding parameter calculation processing of calculating a coding parameter in the step 203, the coding parameter calculating section 110 calculates a coding parameter by using the area information and reliability of the important area output from the important area detecting section 109 and an assigned code amount output from the code amount control section 111 which will be described below. First of all, the coding parameter calculating section 110 divides one screen into two areas including a high picture quality area and a low picture quality area by using the result of the detection of the important area.

Figure 4:
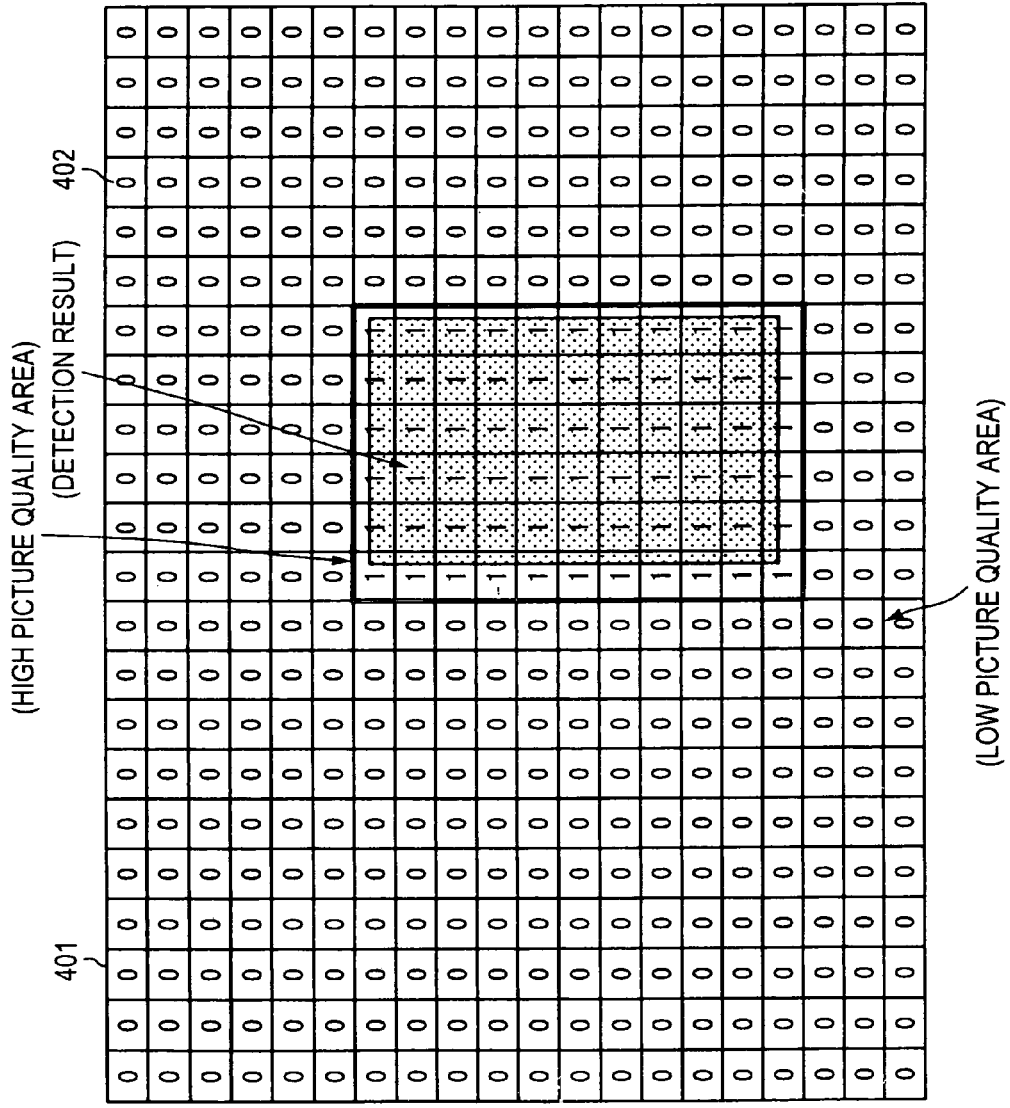
FIG. 4 is a diagram showing an example of an area dividing map according to the first embodiment of the invention.

FIG. 4 is a diagram showing an example of the area division. A small block 402 corresponds to a square block of 16×16 pixels and has four DCT blocks of 8×8 pixels collected. An area dividing map 401 corresponds to one frame. A shading portion represents a result of the detection obtained by the important area detecting section 109.

A group of the small block 402 including the result of the detection is set to be a high picture quality area and other areas are set to be low picture quality areas. In the area dividing map 401, the small block 402 having a value of 1 is set to be that in the high picture quality area and the small block 402 having a value of 0 is set to be that in the low picture quality area.

Next, the coding parameters of the high picture quality area and the low picture quality area are calculated. In the embodiment, a quantization value is set to be the coding parameter to be calculated.

The quantization values in the high picture quality area and the low picture quality area are calculated in three procedures which will be described below in detail.

(1) Description will be given to the calculation of assignment code amounts to the small blocks 402 in the high picture quality area and the low picture quality area. A method of calculating assignment code amounts $A_H$ and $A_L$ to each of the small blocks 402 in the high picture quality area and the low picture quality area by using an assignment code amount Bi of an image i output from the code amount control section 111 which will be described below are expressed in equations (1.1) and (1.2). In the equation (1.1), $A_H$ represents an average assignment code amount of the small block 402 in the high picture quality area, N represents the number of small blocks in one frame, and a represents an assignment scale factor which is a factor for increasing the assignment of a code amount to the high picture quality area. In the equation (1.2), $N_H$ represents the number of small blocks in a selected area and $N_L$ represents the number of small blocks on the outside of the selected area. In the equation (1.3), "reliability" represents a reliability to be a decimal fraction of 0 to 1, and β represents a weighting factor having a positive value.

$$A_H = \frac{B_i}{N} * \alpha \qquad (1.1)$$

$$A_L = \frac{B_i - A_H * N_H}{N_L} * \alpha \qquad (1.2)$$

$$\alpha = (1+\text{reliability}*\beta) \qquad (1.3)$$

The coding parameter calculating section 110 calculates an assignment code amount to the small block 402 in each of the high picture quality area and the low picture quality area by using the equations (1.1) and (1.2). If the reliability "reliability" is higher, the assignment scale factor α is more increased. Therefore, the assignment code amount to the high picture quality area can be increased.

(2) Description will be given to the calculation of a quantization value. After the assignment code amounts to the high picture quality area and the low picture quality area are set, the quantization values in the small blocks 402 are calculated in accordance with the respective assignment code amounts. A method of calculating a quantization value is expressed in an equation (1.9). In the equation (1.9), $Q_H$ represents a quantization value in the high picture quality area, $A_H$ represents an assignment code amount in a small area belonging to the high picture quality area, $Q_L$ represents a quantization value in the low picture quality area, $A_L$ represents an assignment code amount in a small area belonging to the low picture quality area, and f(x) represents a function of returning a quantization value to a code amount x and has such a property as to return a smaller quantization value when the code amount is more increased. In the equation (1.9), $Q_H$ and $Q_L$ are represented by $Q_n$ and $A_H$ and $A_L$ are represented by $A_n$.

$$Q_n = f(A_n) \qquad (1.9)$$

The coding parameter calculating section 110 calculates a quantization value in each of the high picture quality area and the low picture quality area in accordance with the equation (1.9). As described above, the coding parameter calculating section 110 calculates the area dividing map 401 and the quantization value of the small block 402 in each of the high and low picture quality areas, and outputs, to the quantizing section 106, the area dividing map 401 and each of the quantization values which are thus calculated.

In the preprocessing of preprocessing an input image in the step 204, the preprocessing section 103 carries out a necessary preprocessing for the case in which an instruction is given from the coding parameter calculating section 110 to image data output from the input section 102, and outputs the image data thus processed to the motion compensating section 104. The following two preprocessings are carried out. More specifically, there are (1) a prefilter processing of providing a low pass filter over an input image, thereby removing the high frequency component of the image and easily carrying out coding, and (2) a cutout processing of cutting out a partial or whole area of the input image and carrying out a reduction processing to perform an adjustment to a coded image size when an input image size is larger than the coded image size. While neither of both processings is not carried out in the embodiment, they are performed in other embodiments which will be described below.

Moreover, a part of the input image is thus cut out and is subjected to the reduction processing. As compared with a method of reducing the whole input image, consequently, it is possible to produce the visual effects of enlarged display. For example, it is supposed that the input image size is 4CIF (704×576 pixels) and the coded image size is QCIF (176×144 pixels). In this case, a QCIF image created by cutting out a part of the input image (352×288 pixels) and reducing the same input image to ½ can have double visual effects of the enlarged display as compared with a QCIF image created by reducing the whole input image to ¼.

In the video coding processing of coding a video signal in the step 205, the video signal is divided into blocks of 8×8 pixels, and DCT and reverse DCT processings are carried out for each block and a motion prediction, a motion compensation processing, a quantization processing, a reverse quantization processing and a variable-length coding processing are carried out for each small block 402 to be a group of 2×2 blocks. In each processing block, moreover, when the processings of all the blocks or all the small blocks 402 in one frame are ended, the results of the processings are output to a next processing block.

More specifically, the motion compensating section 104 searches for an area having a high correlation by using image data for one frame input from the preprocessing section 103 and a reference image to be a last decoded image on a time basis which is output from the decoding section 108 which will be described below, subtracts a reference image of an area having the highest correlation from an original image to calculate a prediction error, and outputs the prediction error to the DCT section 105. Moreover, a motion vector to an area used for the prediction is output to the variable-length coding section 107 and the decoding section 108. At the beginning of the coding, a decoded image is not present one frame before. Therefore, the motion compensation is not carried out.

The DCT section 105 carries out the discrete cosine transformation (DCT) for the prediction error output from the motion compensating section 104 to calculate a DCT coefficient and to output the DCT coefficient to the quantizing section 106. The quantizing section 106 carries out a quantization processing by using the DCT coefficient input from the DCT section 105, the area dividing map 401 input from the coding parameter calculating section 110, and the quantization values in the high and low picture quality areas. The quantizing section 106 obtains the attribute of each small block 402 (the high picture quality and low picture quality areas) with reference to the area dividing map 401. By using a quantization value according to the attribute, a division is carried out over the DCT coefficient to obtain a quotient. Thus, the quantized DCT coefficient is calculated and the area dividing map 401, the quantization values in the high and low picture quality areas and the quantized DCT coefficient are output to the variable-length coding section 107 and the decoding section 108.

The variable-length coding section 107 carries out variable-length coding over the quantization value output from the quantizing section 106, the quantized DCT coefficient, and a motion vector output from the motion compensating section 104, and outputs a variable-length code to the output section 112 and outputs a generated code amount to the code amount control section 111.

The code amount control section 111 calculates an assignment code amount to a next frame by using the generated code amount output from the variable-length coding section 107 and outputs the assignment code amount to the coding parameter calculating section 110. There will be described a method of calculating an assignment code amount to a frame i by using equations (1.10) and (1.11).

In the embodiment, the code amount control is carried out in a predetermined number of frames and a collection unit of the code amount control will be referred to as GOP. In the equation (1.10), $B_{GOP}$ represents an assignment code amount of 1GOP in the code amount control, T represents a transmission bit rate, $N_{GOP}$ represents the number of frames in the 1GOP, and Framerate represents a frame rate. In the equation (1.11), $B_i$ represents a code amount to be assigned to a frame i and $b_j$ represents a code amount generated in a frame j.

$$B_{GOP} = \frac{T * N_{GOP}}{Framerate} \quad (1.10)$$

$$B_{GOP} = \frac{B_{GOP} - \sum_{j=1}^{i-1} bj}{N_{GOP} - (i-1)} \quad (1.11)$$

A unit of a video to be coded is referred to as a picture. One picture is constituted on one frame unit or one field unit of an original image. The picture includes three kinds of pictures I, P and B by an image referring method and a code amount for each picture is varied.

In the video decoding processing in the step 205, the decoding section 108 multiplies the DCT coefficient by the quantization value of an attribute corresponding to each small block 402 (high and low picture quality areas) by using the area dividing map 401, the quantization values and the quantized DCT coefficients in the high and low picture quality areas which are output from the quantizing section 106, thereby calculating a reverse quantized DCT coefficient. Next, a reverse DCT is carried out over the reverse quantized DCT coefficient to calculate a prediction error after the decoding. By using the motion vector output from the motion compensating section 104, furthermore, a reference area is calculated from a reference frame stored in an internal memory and the reference area is added to the prediction error to calculate a current decoded image. Then, the current decoded image is output to the motion compensating section 104 and the internal memory is replaced with the decoded image.

The video coding apparatus 1 repeats the processings from the step 201 to the step 207 to carry out video coding. In the end decision processing of the step 207, the case in which the input of a video signal is stopped in the input section 102 is decided to be a coding end and the coding processing is thus ended.

The video coding apparatus 1 according to the embodiment comprises the important area detecting section 109 for automatically detecting an important area in a screen and the coding parameter calculating section 110 for calculating a quantization value corresponding to a reliability representing detection precision. Consequently, the coding parameter calculating section 110 more increases a code amount assignment to the detected area and more decreases the quantization value when a detection reliability for the detected area is high. Therefore, it is possible to more enhance a picture quality at such a degree that an area having a high probability of an important area is automatically adapted to the probability. Also in the case in which the reliability is low and a real important area is deviated from a result of the detection, moreover, it is possible to prevent the picture quality of a detection error area from being extremely deteriorated in the real important area.

While a uniform value is used in each area for the code amount assignment to the small block 402 in each of the inside and outside of the selected area in the embodiment, it is also possible to carry out the code amount assignment corresponding to the degree of complexity of the small block 402 as in general code amount control.

Additionally, in order to perform a computer as the described video coding apparatus of this embodiment, a program, which is applicable to a computer, is also proposed.

The program is utilized for causing a computer to execute coding of a video signal based on a coding parameter setting a coding bit amount, the computer being caused to function as important area detecting means for detecting, as an important area, a preset specific area in a display image by the video signal for which a high visibility is required, and calculating a reliability indicative of precision in a detection result of the specific area; and coding parameter calculating means for calculating a coding parameter of the detected area corresponding to a value of the reliability thus calculated.

Second Embodiment

Next, description will be given to a second embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. An video coding apparatus 1 according to the embodiment also codes a video signal in a determined transmission bit rate, and comprises a motion compensating section 104, an important area detecting section 109 for automatically detecting an important area in a screen, and a coding parameter calculating section 110 for calculating an image update rate corresponding to a reliability representing detection precision.

Next, the embodiment will be described. In the embodiment, operations other than those of the coding parameter calculating section 110 and the motion compensating section 104 are the same as those in the first embodiment. Therefore, two functional blocks having different operations will be described below.

The coding parameter calculating section 110 according to the embodiment carries out-an area division in the same manner as in the first embodiment by using a detection result and a detection reliability which are output from the important area detecting section 109, thereby calculating an image update rate for each area.

In the procedure for calculating the image update rate in the coding parameter calculating section 110 according to the embodiment, (1) the same processing as the calculation of an assignment code amount to a small block 402 in each of a high picture quality area and a low picture quality area in the coding parameter calculating section 110 according to the first embodiment is carried out to calculate each assignment code amount, and an image update rate in each of the high and low picture quality areas is calculated by using the same value. For this reason, when the assignment code amount in each of the high and low picture quality areas is determined, a screen update rate is calculated for the calculation of the image update rate of the coding parameter calculating section 110 according to the embodiment in accordance with the assignment code amount. Before the calculation of the screen update rate, the quantization value of a frame i is calculated in accordance with an equation (2.1). In the equation (2.1), $Q_i$ represents a quantization value of the frame i, $B_i$ represents an assignment code amount of the frame i, N represents the number of small blocks in a frame, and $f(x)$ represents a function of returning a quantization value to the code amount in the same manner as in the equation (1.9).

$$Q_i = f(B_i/N) \qquad (2.1)$$

It is assumed that a common value is used for the quantization values in the high and low picture quality areas. An example of a method of calculating a screen update rate is expressed in an equation (2.2). In the equation (2.2), $fps_H$ represents a screen update rate in the high picture quality area, $A_H$ represents an assignment code amount of the small block 402 in the high picture quality area, $fps_L$ represents a screen update rate of the low picture quality area, $A_L$ represents an assignment code amount of the small block 402 in the low picture quality area, and $g(x, q)$ represents a function of returning the screen update rate to a code amount x and a quantization value q and has such a property as to return a high screen update rate when the code amount x is large and the quantization value q is great.

$$fps_H = g(A_H, Q_H)$$
$$fps_L = g(A_L, Q_L) \qquad (2.2)$$

When the screen update rates in the high and low picture quality areas are calculated in accordance with the equation (2.2), the screen update rate in the high picture quality area is more increased if a detection reliability is higher.

As described above, the coding parameter calculating section 110 calculates an area dividing map 401 and the quantization value of each small block 402 of the high and low picture quality areas, and outputs, to a quantizing section 106, the area dividing map 401 and each quantization value which are thus calculated. Furthermore, the coding parameter calculating section 110 decides whether coding is carried out or not in accordance with the image update rate thus calculated. If the coding is not carried out, a coding skip signal is output to the motion compensating section 104.

With reference to the screen update rates of the high and low picture quality areas, the coding parameter calculating section 110 decides that the coding is to be carried out for an area in which the screen update rate is equal to an input frame rate. To the contrary, when the screen update rate is different from the input frame rate, it is decided that the coding is to be carried out only when the following equation (2.3) is true. For an area in which it is decided that the coding is not carried out, a coding skip signal and the area dividing map 401 are output to the motion compensating section 104.

In the equation (2.3), i represents a value of a frame counter, x mod y represents a remainder obtained by dividing x by y, $fps_{input}$ represents an input frame rate and $fps_n$ represents a screen update rate. The coding parameter calculating section 110 increases the frame counter by 1 after the output of data.

$$\left[i \bmod \left(\frac{fps_{input}}{fps_n}\right)\right] = 0 \quad (2.3)$$

Referring to the small block 402 of a picture quality area to which an instruction for a coding skip is given from the coding parameter calculating section 110, the motion compensating section 104 initializes the input image of the corresponding small block 402 to zero with reference to the area dividing map 401 and outputs the input image to a DCT section 105. Consequently, the area to which the instruction for the coding skip is given is brought into such a state that a screen is not updated.

According to the embodiment, there are provided the important area detecting section for automatically detecting an important area in a screen and the coding parameter calculating section 110 for increasing the screen update rate of a detected area if a detection reliability is high for the detected area. Consequently, it is possible to obtain an image having a high screen update rate and a smooth motion at such a degree that an area having a high probability of the important area is automatically adapted to the probability. Also in the case in which the reliability is low and a detection result is deviated from a real important area, moreover, it is possible to prevent the smoothness of the motion from being extremely deteriorated in the detection error portion of the real important area.

While the example in which each screen update rate is calculated from the assignment code amounts of the high and low picture quality areas has been described in the embodiment, it is not restricted to the use of the assignment code amount. In video coding in a low bit rate, particularly, the residual amount of a virtual buffer and a frame skipping threshold in the coding are generally used to carry out a coding skip processing without coding the small block 402 or the frame. Thus, the video coding apparatus 1 sets the frame skipping threshold to carry out the coding skip processing. As a result, the screen update rate can be varied. By utilizing the screen update rate, the frame skipping threshold is obtained for each of the high and low picture quality areas and is compared with a generated code amount for each area. Thus, the coding skip processing is carried out for each area.

Figure 5:
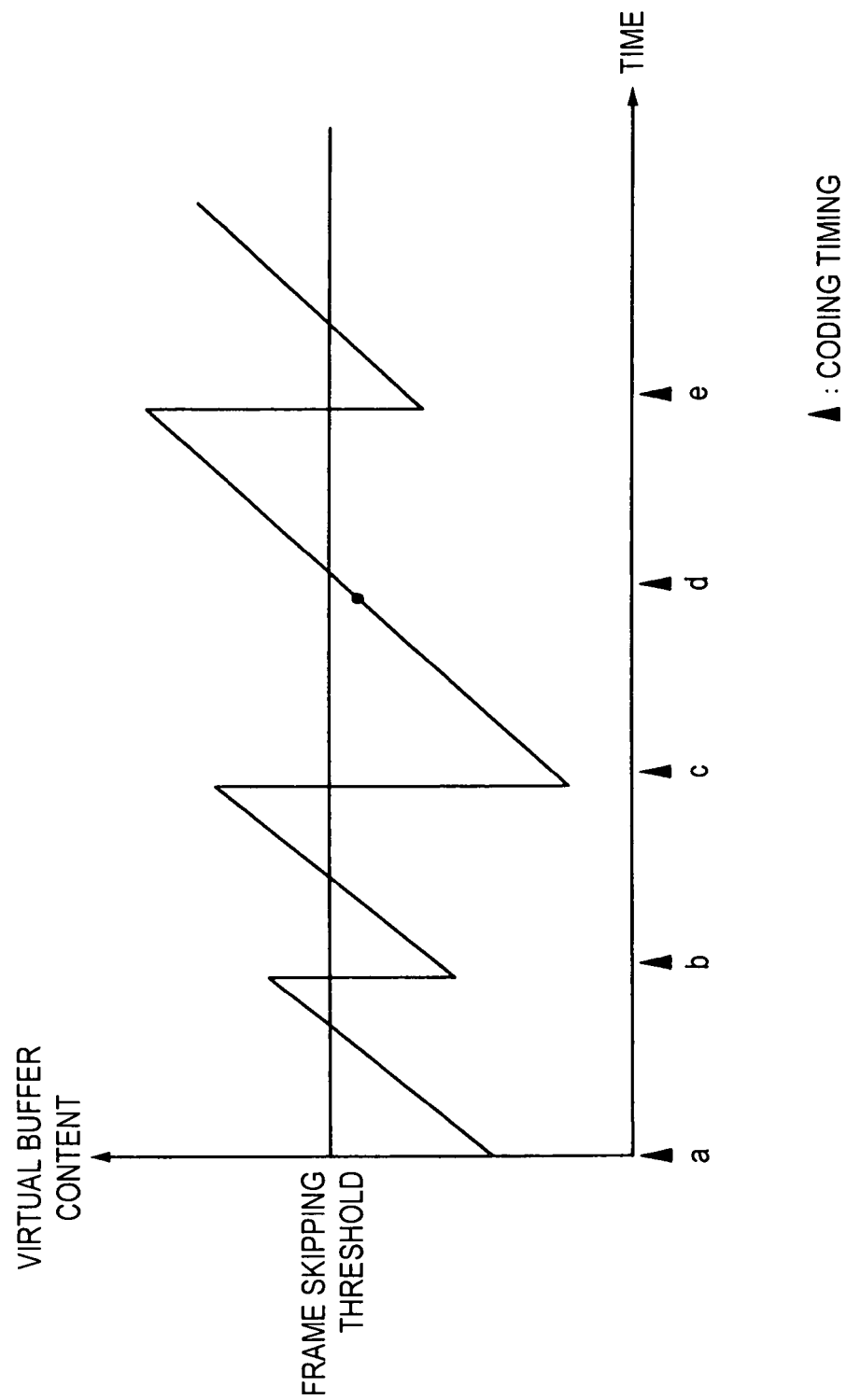
FIG. 5 is a conceptual view for explaining a frame skipping decision according to a second embodiment of the invention.

FIG. 5 is a conceptual view showing a frame skipping decision. The virtual buffer is provided in the video coding apparatus 1 and serves to measure the temporal transition of a code amount in the video coding apparatus 1. The code amount in the video coding apparatus 1 is increased every time an video is input and coded, and is decreased by outputting a code from the video coding apparatus 1 to a transmission path at a constant rate per unit time.

A graph in FIG. 5 represents the temporal transition of the residual amount of the virtual buffer. Every time a video is input and coded (which will be hereinafter referred to as a coding timing), the code amount is increased so that the residual amount is decreased, and a code is output from the buffer at a constant rate so that the residual amount is increased at a constant rate. In each coding timing, it is decided whether the coding is carried out or not (the frame skipping decision) depending on the residual amount of the virtual buffer. A value to be used in the frame skipping decision is a frame skipping threshold. In FIG. 5, in a coding timing d, the residual amount of the virtual buffer is equal to or smaller than the frame skipping threshold. Therefore, it is decided that the coding is not carried out. For this reason, the residual amount is not decreased in the coding timing d.

Third Embodiment

Next, description will be given to a third embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. A video coding apparatus 1 according to the embodiment also codes a signal in a determined transmission bit rate, and comprises a preprocessing section 103 for preprocessing an input video signal, an important area detecting section 109 for automatically detecting an important area in a screen, and a coding parameter calculating section 110 for calculating the strength of the prefilter of the preprocessing section 103 provided on the outside of an important area corresponding to a reliability representing detection precision.

Next, an operation according to the embodiment will be described. In the embodiment, operations other than those of the preprocessing section 103 and the coding parameter calculating section 110 are the same as those in the first embodiment. Therefore, two functional blocks having different operations will be described below.

The coding parameter calculating section 110 according to the embodiment creates an area dividing map 401 in the same manner as described in the first embodiment by using a detection result and a detection reliability which are output from the important area detecting section 109, calculates the quantization values of a high picture quality area and a low picture quality area according to the reliability and outputs them to a quantizing section 106. Furthermore, the coding parameter calculating section 110 calculates the strength of the prefilter to be provided over the low picture quality area by using the detection reliability, and outputs the area dividing map 401 and the strength of the prefilter to the preprocessing section 103.

In the preprocessing section 103 according to the embodiment, a smoothing filter is used for the prefilter and the strength of the filter is set to be the number of taps of the smoothing filter. More specifically, a prefilter having a tap number M serves to replace a median pixel value of (2M+1)× (2M+1) pixels with an average value of the (2M+1)×(2M+1) pixels. The prefilter is not restricted to the smoothing filter but any filter can be used.

A method of calculating the strength of the prefilter is expressed in the following equation (3.1). In the equation (3.1), $T_n$ represents the number of taps of the prefilter for a small block n, $A_L$ represents an assignment code amount of the low picture quality area, and h(x) represents a function of returning the number of taps to a code amount x and returning a smaller number of taps for a larger code amount. In accordance with the equation (3.1), the number of taps to be the strength of the prefilter is calculated and is output as the strength of the prefilter to the preprocessing section 103.

$$T_n = h(A_n) \quad (3.1)$$

The preprocessing section 103 carries out a filtering processing for an input image output from an input section 102 by using the area dividing map 104 output from the coding parameter calculating section 110 and prefilters having various strengths.

As described above, it is assumed that a smoothing filter is used for the filtering processing of the preprocessing section 103 according to the embodiment. The preprocessing section 103 carries out a processing of replacing the average value of the (2M+1)×(2M+1) pixels with the median pixel, in which a filter strength=a tap number is set to be M for a pixel in the low picture quality area, and outputs image data to a motion compensating section 104 after the filtering.

In the filtering processing of the preprocessing section 103, thus, when a smoothing filter having a larger number of taps is used, the high frequency component of an image which is reduced by the filtering is increased and the amount of a code generated after the coding is also decreased so that a blurred image is obtained. In the coding parameter calculating section 110, moreover, when the detection reliability is increased, an assignment code amount to the low picture quality area is decreased. Based on the equation (3.1), therefore, the prefilter strength is set to be great and a higher frequency component is removed from the low picture quality area so that the code amount can be reduced.

According to the embodiment, the coding parameter calculating section 110 sets, to the preprocessing section 103, a prefilter which is stronger against the surrounding low picture quality area if the detection reliability of an important area which is obtained by the important area detecting section 109 is higher. Consequently, if a probability of the important area is higher, areas other than the important area are caused to have a more blurred picture quality so that the code amount can be reduced. Thus, it is possible to intensively assign a code amount to an area having a high probability of the important area, thereby enhancing the picture quality. Also in the case in which the reliability is low and the detected area is shifted from a real important area, moreover, it is possible to prevent a detection error portion in the real important area (this portion also has a high reliability to some extent) from becoming an extremely blurred image, thereby suppressing a deterioration in the picture quality on the outside of the important area.

Fourth Embodiment

Next, description will be given to a fourth embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. A video coding apparatus 1 according to the embodiment also codes a video signal in a determined transmission bit rate, and comprises a preprocessing section 103, an important area detecting section 109 for automatically detecting an important area in a screen, and a coding parameter calculating section 110 for calculating the cutout size of the important area from an input image corresponding to a reliability representing detection precision.

Next, an operation according to the embodiment will be described. Since operations other than those of the coding parameter calculating section 110 and the preprocessing section 103 according to the embodiment are the same as those in the first embodiment, two functional blocks having different operations will be described below.

In the embodiment, moreover, it is supposed that the size of an image input from an input section 102 is 4CIF (704×576 pixels) and a coding size is QCIF (176×144 pixels), and the preprocessing section 103 cuts out a part of the input image and carries out a reduction processing over the coding size if necessary.

Figure 6:
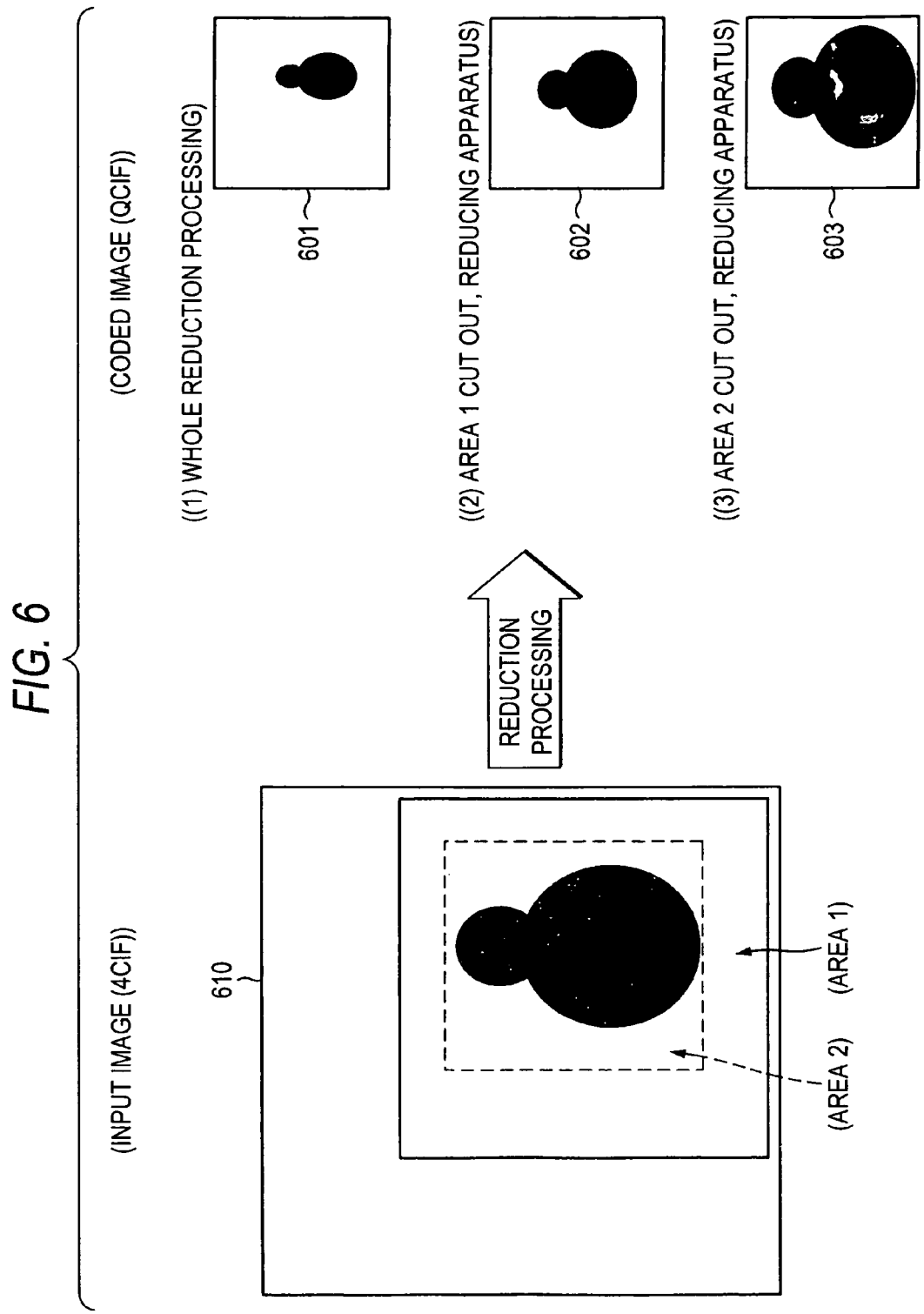
FIG. 6 is a conceptual view for explaining a cutout reduction processing according to a fourth embodiment of the invention.

FIG. 6 is a conceptual view showing the reduction processing in the preprocessing section 103. In FIG. 6, it is supposed that the input image size is 4CIF and the coding size is QCIF. A reduced image 601 is obtained by cutting out and reducing a whole input image 610, a reduced image 602 is obtained by cutting out and reducing an area 1 portion from the input image 610, and a reduced image 603 is obtained by cutting out and reducing an area 2 portion from the input image 610. By comparison of these reduced images 601 to 603, the reduced image 603 having the greatest cutout size is enlarged most greatly.

The coding parameter calculating section 110 according to the embodiment calculates the cutout area of an input image by using a detection result and a detection reliability which are output from the important area detecting section 109, and outputs cutout area information to the preprocessing section 103.

Figure 7:
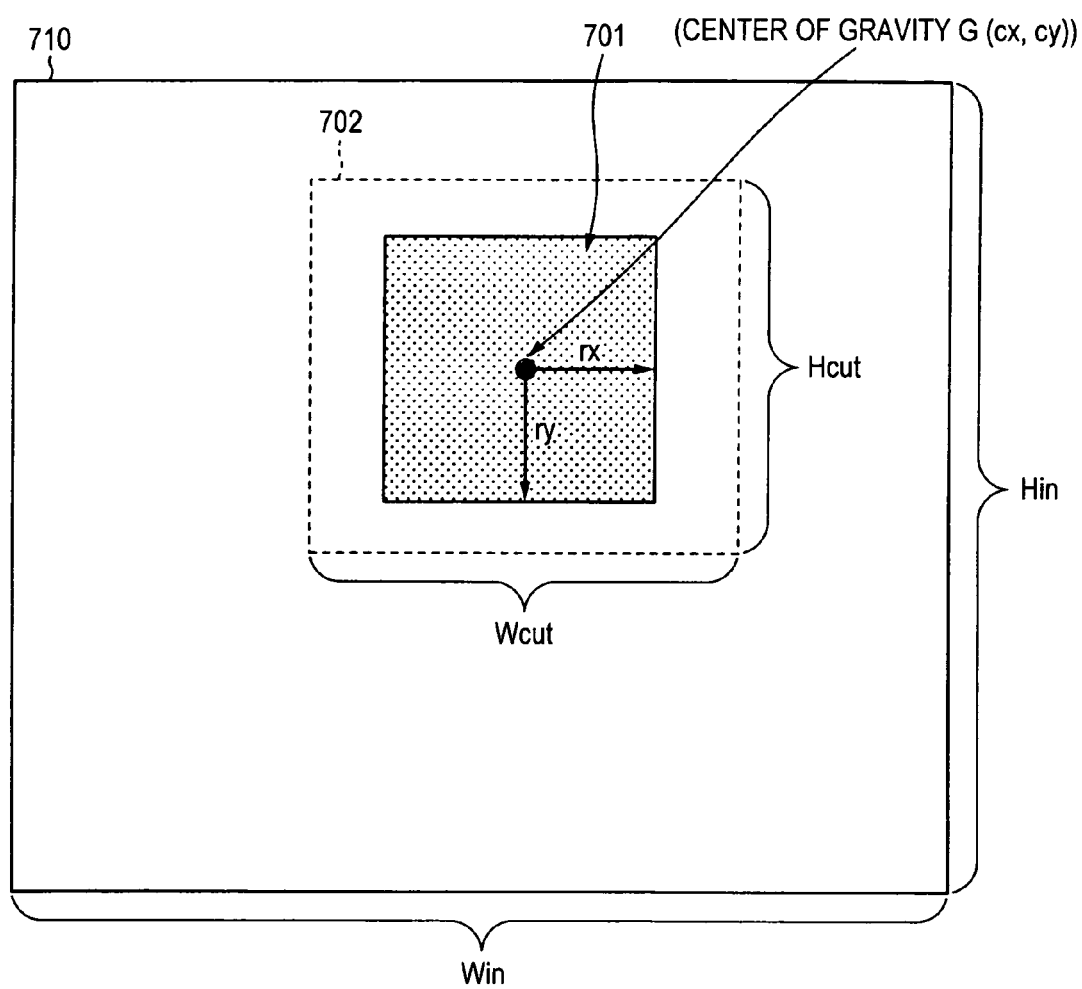
FIG. 7 is a conceptual view showing an example of cutout area calculation according to the fourth embodiment of the invention.
Figure 8:
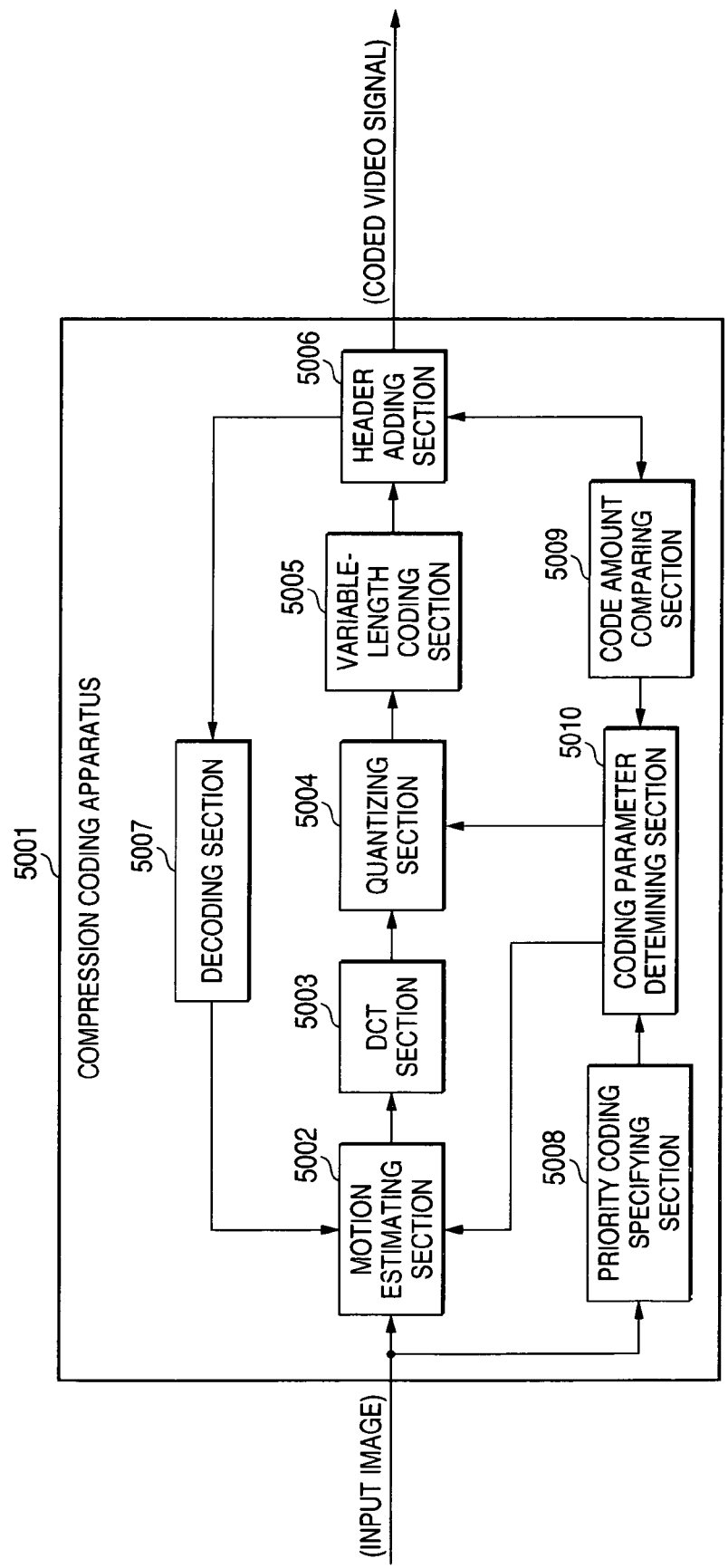
FIG. 8 is a block diagram showing an example of the structure of a conventional video coding apparatus.

FIG. 7 is a conceptual view showing cutout area calculation. In FIG. 7, an input image 710 is an image having $W_{in}$=704 and $H_{in}$=756, an important area 701 is a detected area output from the important area detecting section 109, and a cutout area 702 is a cutout area calculated by the coding parameter calculating section 110 which has a size of $H_{cut} \times W_{cut}$ pixels and satisfies an equation (4.1) to maintain an aspect ratio.

$$W_{in}:H_{in}=W_{cut}:H_{cut} \tag{4.1}$$

A method of calculating a cutout size corresponding to a reliability is expressed in the following equations (4.2) to (4.5). The equation (4.2) serves to adapt the important area 701 to the aspect ratio of the input image 710. In the equation (4.2), rx represents a radius in a horizontal direction of the important area 701, ry represents a radius in a longitudinal direction of the important area 701, $W_{in}$ represents a horizontal size of the input image 710, $H_{in}$ represents a longitudinal size of the input image 710, $W_{orig}$ represents a horizontal size obtained by correcting the aspect ratio of the important area 701, and $H_{orig}$ represents a longitudinal size obtained by correcting the aspect ratio of the important area 701. In the equation (4.3), γ represents an enlargement ratio of the important area 701, α represents a weighting factor having a positive value and Reliability represents a detection reliability having a positive value of 1 or less. In accordance with the equation (4.3), when the reliability Reliability is lower, the enlargement ratio γ is higher.

In the equation (4.4), $γ_{max}$ defines an upper limit of the enlargement ratio. It is assumed that γ calculated by the equation (4.4) does not exceed $γ_{max}$. In the equation (4.5), $W_{cut}$ represents a horizontal size of the cutout area 702 and $H_{cut}$ represents a longitudinal size of the cutout area 702, and the respective sizes of the detected areas are multiplied by the enlargement ratio.

$$\text{if } \left(\frac{rx}{ry} \geq \frac{W_{in}}{H_{in}}\right) \text{ then } W_{orig}=2 \times rx, H_{orig}=W_{orig} \times \frac{H_{in}}{W_{in}} \tag{4.2}$$
$$\text{else } H_{orig}=2 \times ry, W_{orig}=H_{orig} \times \frac{W_{in}}{H_{in}}$$

$$\gamma = \left(1 + \frac{\alpha}{\text{Reliability}}\right) \tag{4.3}$$

$$\gamma_{max} = \frac{W_{in}}{W_{orig}} \tag{4.4}$$

$$W_{cut}=W_{orig} \times \gamma, H_{cut}=H_{orig} \times \gamma \tag{4.5}$$

As described above, the coding parameter calculating section 110 according to the embodiment calculates, as the cutout area 702, a larger area than the important area 701 to be the detection result if the detection reliability is lower, and outputs center-of-gravity coordinates (cx, cy) and the horizontal and longitudinal sizes $H_{cut}$ and $W_{cut}$ to the preprocessing section 103. Moreover, the coding parameter calculating section 110 calculates the quantization value of a high picture quality area in the same manner as in the first embodiment, and outputs, to a quantizing section 106, an area dividing map 401 having all values of 1, that is, the area dividing map 401 having a whole screen to be the high picture quality area and the quantization value.

The preprocessing section 103 carries out a reduction processing such that an area having the center-of-gravity coordinates (cx, cy) and the horizontal and longitudinal sizes $H_{cut}$ and $W_{cut}$ in the cutout area 702 which are output from the coding parameter calculating section 110 has a coding size to be cut out of the input image 710 output from the input section 102, and outputs a reduced image to a motion compensating section 104.

According to the embodiment, the coding parameter calculating section 110 sets the size of the important area 701 cut out of the input image 710 to be smaller when the detection reliability of the important area 701 which is obtained by the important area detecting section 109 is higher. In the coding parameter calculating section 110, therefore, an enlargement ratio can be more increased to carry out the coding. In the case in which the detection reliability is low, moreover, the area to be cut out of the input image 710 is set to be larger than the detected important area 701. In the case in which a detection ratio is low, consequently, it is possible to reduce a possibility that the real important area 701 might leak out of the cutout area 702 even if a detection result is deviated from the real important area 701, for example. Thus, it is possible to produce enlargement effects without the influence of a detection ratio.

Fifth Embodiment

Next, description will be given to a fifth embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. A video coding apparatus 1 according to the embodiment also codes a video signal in a determined transmission bit rate, and comprises a preprocessing section 103 for preprocessing an input video, an important area detecting section 109 for automatically detecting an important area 701 in a screen, and a coding parameter calculating section 110 for calculating the enlargement correction ratio of the important area 701 from an input image 710 corresponding to a reliability representing detection precision.

Next, an operation according to the embodiment will be described. In the video coding apparatus 1 according to the embodiment, operations other than those of the coding parameter calculating section 110 and the preprocessing section 103 are the same as those in the first embodiment shown in FIG. 1. Therefore, two functional blocks having different operations will be described below.

The coding parameter calculating section 110 according to the embodiment corrects the size of the important area 701 corresponding to the value of a reliability by using a detected area and a detection reliability which are output from the important area detecting section 109, thereby calculating a high picture quality area. The reason why the size of the important area 701 is corrected is that there is a possibility that a real important area might be shifted from the detected important area if the reliability is low. In this case, if the detected area is set to be the high picture quality area, the real important area is set to be a low picture quality area so that the real important area cannot be enhanced in a picture quality. In the embodiment, if the value of the reliability is small, the detected area is enlarged corresponding to the value, thereby correcting the area.

A method of calculating the enlargement ratio of area correction is expressed in the following equation (5.1). In the equation (5.1), γ represents an enlargement ratio of an area, α represents an enlarged weighting factor having a positive value and Reliability represents a reliability. In accordance with the equation (5.1), the enlargement ratio of an area is set to be higher if the reliability is lower. In an equation (5.2), $\gamma_{max}$ represents an upper limit of the enlargement ratio, $W_{in}$ represents a horizontal size of the input image 710 and rx represents a radius in a horizontal direction of the detected important area 701, and it is assumed that the enlargement ratio γ does not exceed $\gamma_{max}$. In an equation (5.3), rx' represents a radius in a horizontal direction of the important area 701 which is obtained after the enlargement and correction, ry' represents a radius in a longitudinal direction of the important area 701 which is obtained after the enlargement and correction, and ry represents a radius in a longitudinal direction of the detected important area 701.

$$\gamma = \left(1 + \frac{\alpha}{\text{Reliability}}\right) \quad (5.1)$$

$$\gamma_{max} = \frac{W_{in}}{2 \times rx} \quad (5.2)$$

$$rx' = rx \times \gamma, \ ry' = ry \times \gamma \quad (5.3)$$

The coding parameter calculating section 110 enlarges and corrects the detected important area 701 in accordance with the equations (5.1) to (5.3) and then sets a high picture quality area constituted by a small block 402 including the important area 701 obtained after the correction in the same manner as in the first embodiment, thereby correcting an area dividing map 401. Furthermore, the coding parameter calculating section 110 calculates a quantization value for each of high and low picture quality areas in the same manner as in the first embodiment, and outputs the area dividing map 401 and the quantization values in the high and low picture quality areas to a quantizing section 106. The preprocessing section 103 carries out a reduction processing over the input image 710 based on cutout area information output from the coding parameter calculating section 110 and outputs a reduced image to a motion compensating section 104.

According to the embodiment, the coding parameter calculating section 110 enlarges and corrects the detected important area 701 more greatly if the detection reliability is lower. Also in the case in which detection precision is low, consequently, it is possible to enhance the picture quality of the real important area 701 irrespective of the detection precision. Also in the case in which a probability of the important area

701 is low, accordingly, the picture quality of the real important area 701 is not deteriorated erroneously but can be enhanced.

Sixth Embodiment

Next, description will be given to a sixth embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. A video coding apparatus 1 according to the embodiment also codes a video signal in a determined transmission bit rate, and comprises an important area detecting section 109 for automatically detecting an important area 701 in a screen, and a coding parameter calculating section 110 for deciding whether the important area 701 is cut out of an input image 710, a quantization value is weighted and is thus calculated or they are combined corresponding to a reliability representing detection precision.

Next, an operation according to the embodiment will be described. Since operations other than the operation of the coding parameter calculating section 110 of the video coding apparatus 1 according to the embodiment are the same as those in the fourth embodiment, a functional block having a different operation will be described below. In the present embodiment, moreover, it is supposed that the size of the input image 710 is 4CIF (704×576 pixels) and a coding size is QCIF (176×144 pixels), and a preprocessing section 103 cuts out a part of the input image 710 and carries out a reduction processing over the coding size if necessary.

The coding parameter calculating section 110 decides whether the important area 701 is cut out or different quantization values are calculated between high and low picture quality areas by using a detection result and a reliability which are output from the important area detecting section 109, and outputs cutout area information thus calculated to the preprocessing section 103, and furthermore, outputs an area dividing map 401 and the quantization values of the high and low picture quality areas to a quantizing section 106.

The coding parameter calculating section 110 sets the reliability to be a criterion and cuts out and codes the important area 701 if the reliability is equal to or higher than a certain threshold, and simultaneously sets the important area into the high picture quality area and sets the quantization value to be smaller than that in the low picture quality area. To the contrary, in the case in which the reliability is lower than the threshold, the important area 701 is not cut out but the important area is set into the high picture quality area and the quantization value is set to be smaller than that in the low picture quality area.

In the embodiment, it is assumed that a method of cutting out the important area 701, that is, calculating a cutout area 702 is the same as that of the fourth embodiment and a larger area than the important area 701 is set to be the cutout area 702 if the reliability is lower. Moreover, it is assumed that a method of setting a high picture quality area and a method of calculating the quantization values of the high and low picture quality areas are the same as those in the first embodiment and a smaller quantization value is set if the reliability is higher.

According to the embodiment, as described above, the coding parameter calculating section 110 cuts out the important area 701 and enhances a picture quality if the detection reliability is higher than a certain threshold. Thus, the important area 701 can be more enlarged so that the picture quality can be enhanced. To the contrary, if the reliability is low, the cutout is not carried out but only an enhancement in the picture quality is performed. Also in the case in which detection precision is low, consequently, the visibility of the important area 701 can be maintained to be high and the coding can be thus carried out. Accordingly, it is possible to maintain the visibility of the important area 701 to be high without the influence of the detection precision.

Seventh Embodiment

Next, description will be given to a seventh embodiment of the video coding apparatus according to the invention. Since the structure of the video coding apparatus according to the embodiment is the same as that of the first embodiment shown in FIG. 1, the structure of each portion having the same structure will be omitted and reference will be made to the drawings used in the first embodiment. A video coding apparatus I according to the embodiment also codes a video signal in a determined transmission bit rate, and comprises an important area detecting section 109 for automatically detecting an important area 701 in a screen, and a coding parameter calculating section 110 for changing a coding priority mode corresponding to the size of a detected area.

Next, an operation according to the embodiment will. be described. In the embodiment, operations other than the operation of the coding parameter calculating section 110 according to the third embodiment are the same as those in the second embodiment. Therefore, a functional block 110 having a different operation will be described below. The coding parameter calculating section 110 according to the embodiment selects a coding priority mode by using a detection result and a reliability which are output from the important area detecting section 109 and calculates a coding parameter in accordance with the priority mode.

In the embodiment, the coding priority mode supposes (1) a motion priority mode, that is, a coding mode for causing a reduction in a screen update spacing to have priority over an enhancement in a picture quality and giving priority to a motion smoothness, and (2) a picture quality priority mode, that is, a coding mode for causing the enhancement in the picture quality to have priority over the reduction in the screen update spacing and for giving priority to the picture quality of a screen.

The decision of the priority mode in the coding parameter calculating section 110 is carried out by using a ratio of the size of the important area 701 to that of an input image 710. In the case in which the size of the important area 701 is smaller than that of the input image 710, a deterioration in the picture quality of the small area is less remarkable. In order to enhance the visibility of an image, therefore, priority is more effectively given to the motion smoothness than the picture quality. To the contrary, in the case in which the size of the important area 701 is greater than that of the input image 710, a deterioration in the picture quality of the large area is more remarkable. In order to enhance the visibility of the image, therefore, priority is more effectively given to the picture quality than the motion.

Accordingly, the coding parameter calculating section 110 sets the picture quality priority mode if the size of the important area 701 is equal to or larger than a certain threshold, and sets the motion priority mode if the size of the important area 701 is smaller than the certain threshold. Thus, a coding parameter is calculated. A threshold to be used in the coding mode decision is set to be ½ of the input image 710, for example, and is not restricted thereto but any value can be used.

Prior to the decision of the priority mode, the coding parameter calculating section 110 sets a high picture quality area to calculate an area dividing map 401 in the same manner as in the first embodiment by using a detection result output from the important area detecting section 109.

A method of calculating a coding parameter in each of the coding modes will be described below.

(1) In the picture quality priority mode, the coding parameter calculating section 110 decides that the picture quality priority mode is set if the size of the important area 701 is equal to or larger than a half of the size of the input image 710. If the size of the important area 701 is more increased, the quantization value of the important area 701 is set to be smaller and a whole screen update spacing is set to be greater. In the embodiment, a horizontal size is used for the size of the important area 701 and this is not restricted, and any value representing a size can be used.

A method of calculating the quantization value of the important area 701 and the screen update spacing is expressed in the following equation (7.1). In the equation (7.1), rx represents a radius in a horizontal direction of the important area 701, $W_{in}$ represents a horizontal size of the input image 710, and δ represents a ratio of a horizontal size to the input image 710 of the important area 701 which has a value increased if the size of the important area 701 is increased and has a maximum value of 1.0. In an equation (7.2), $A_H$ represents an assignment code amount to a high picture quality area which is calculated by the equation (1.1), f(x) represents the same function as that of the equation (1.9) and has such a feature as to return a smaller value if x is greater, and $Q_H$ represents a quantization value of the high picture quality area and is set to be small if the size ratio δ of the important area 701 is high. In an equation (7.3), $A_L$ represents an assignment code amount to a low picture quality area which is calculated by the equation (1.2) and $Q_L$ represents a quantization value of the low picture quality area. In an equation (7.4), g(a, q) represents the same function as that of the equation (2.2) and has such a feature as to return a greater value if a and q are greater. fps represents a screen update rate which is common to the high and low picture quality areas.

$$\delta = \frac{2 \times rx}{W_{in}} \tag{7.1}$$

$$Q_H = f(A_H \times (1+\delta)) \tag{7.2}$$

$$Q_L = f(A_L) \tag{7.3}$$

$$fps = g(A_H, Q_H) \tag{7.4}$$

By using the equations (7.1) to (7.4), the quantization values of the high and low picture quality areas and the common screen update rate are calculated. More specifically, when the size of the important area 701 is greater, the quantization value of the high picture quality area is set to be smaller by the equation (7.2) so that a picture quality can be maintained to be high. Moreover, the quantization value is set to be small. Therefore, the screen update rate is correspondingly set to be small in accordance with the equation (7.4).

(2) In the motion priority mode, the coding parameter calculating section 110 decides that the motion priority mode is set if the size of the important area 701 is smaller than a half of the size of the input image 710. If the size of the important area 701 is more increased, the image update rate of the important area 701 is set to be higher and a whole quantization value is set to be smaller. In the embodiment, a horizontal size is used for the size of the important area 701 and this is not restricted, and any value representing a size can be used.

A method of calculating the quantization value of the important area 701 and the screen update spacing is expressed in the following equation (7.10). In the equation (7.10), δ represents a ratio of the size of the important area 701 which is calculated by the equation (7.1) and has such a feature as to be smaller if the size is smaller, $A_H$ represents an assignment code amount to a high picture quality area which is calculated by the equation (1.1), f(x) represents the same function as that of the equation (1.9.) and has such a feature as to return a smaller value if x is greater, and Q represents a quantization value which is common to the high and low picture quality areas and is set to be greater if the size ratio δ of the important area 701 is lower. In an equation (7.11), g(a, q) represents the same function as that of the equation (2.2) and has such a feature as to return a greater value if a and q are greater. $fps_H$ represents a screen update rate of the high picture quality area. In an equation (7.12), $A_L$ represents an assignment code amount to the low picture quality area which is calculated by the equation (1.2), and $fps_L$ represents a screen update rate of the low picture quality area.

$$Q_H = f(A_H \times \delta) \tag{7.10}$$

$$fps_H = g(A_H, Q) \tag{7.11}$$

$$fps_L = g(A_L, Q) \tag{7.12}$$

By using the equations (7.10) to (7.12), the quantization value which is common to the high and low picture quality areas and the screen update rate of each of the high and low picture quality areas are calculated. More specifically, when the size of the important area 701 is smaller, the quantization value which is common to the high and low picture quality areas is set to be greater by the equation (7.10). Moreover, the quantization value is set to be greater. Therefore, the screen update rate of the high picture quality area is correspondingly set to be greater in accordance with the equation (7.11).

As described above, the coding parameter calculating section 110 decides the coding priority mode in accordance with the size of the important area 701, calculates the area dividing map 401, the quantization value of each small block 402 of the high and low picture quality areas and the screen update rate in accordance with the priority mode, and outputs, to a quantizing section 105, the area dividing map 401 and each quantization value which are thus calculated.

In the same manner as in the second embodiment, furthermore, the coding parameter calculating section 110 decides whether the coding is carried out or not in accordance with the calculated image update rate and outputs a coding skip signal to a motion compensating section 104 if the coding is not carried out. The coding parameter calculating section 110 outputs data and then increases a frame counter by one.

Referring to the small block 402 of a picture quality area to which an instruction for a coding skip is given from the coding parameter calculating section 110, the motion compensating section 104 initializes the input image 710 of the corresponding small block 402 to zero with reference to the area dividing map 401 and outputs the input image 710 to a DCT section 105. Consequently, the area to which the instruction for the coding skip is given is brought into such a state that a screen is not updated.

According to the embodiment, the coding parameter calculating section 110 sets the quantization value of the detected important area 701 to be small if the size of the important area 701 is large and a deterioration in a picture quality is remarkable. Consequently, the coding to give priority to the picture quality can be carried out. To the contrary, in the case in which the size of the important area 701 is small and the deterioration in the picture quality is less remarkable, the screen update rate of the important area 701 is set to be high so that the coding to give priority to a motion smoothness can be carried out.

Accordingly, a visibility can be maintained to be high corresponding to the size of the important area 701, thereby carrying out the coding.

The invention is not restricted to the embodiments but may be carried out based on other various embodiments in respect of specific structures, functions, actions and effects without departing from the scope thereof. For example, a coding parameter can be obtained by combining at least two of a quantization value, an update rate, a frame skipping threshold, a prefilter, a cutout size and an area correcting parameter.

As described above in detail, according to the first aspect of the invention, there is provided the area selecting means capable of selecting an optional area in a screen by a user. The coding control means changes a coding parameter for the area selected by the user. Consequently, the user can select an area in which a picture quality in the screen is to be enhanced for a video.

According to the second aspect of the invention, there is provided the important area detecting means capable of automatically selecting an area in which a picture quality in a screen is to be enhanced. A coding parameter is calculated and set by the coding parameter calculating means for the detected area. Consequently, a user does not need to manually select an important area in the screen for a video. The video coding apparatus automatically changes the coding parameter of the important area so that a picture quality thereof can be enhanced with a distinction from another area and the visibility of the same area can be enhanced.

According to the third aspect of the invention, there is provided the important area detecting means capable of automatically selecting an area in which a picture quality is to be enhanced in a screen. For the detection result of the detected area, a coding parameter is calculated and set stepwise by the coding parameter calculating means. Also in the case in which the important area does not become the detected area, consequently, it is possible to prevent viewing from being disturbed due to an extreme deterioration in the picture quality.

According to the fourth aspect of the invention, the important area detecting means calculates a reliability representing precision in a detection result, and the coding parameter calculating means calculates a coding parameter of a detected area or the outside of the detected area corresponding to the value of the reliability calculated by the important area detecting means. Consequently, the coding parameter can be set such that a visibility is more increased in an area having a higher reliability and a higher probability of an important area. Thus, it is possible to prevent a picture quality in the important area which does not become the detected area from being extremely deteriorated, resulting in an extreme degradation in the visibility of the same area.

According to the fifth aspect of the invention, there is provided the preprocessing section of cutting out a detected area from an input image or carrying out an automatic adjustment to have such a size as to be seen easily by using the detection result of the important area detecting means. Consequently, a user does not need to select an important area in the input image and can see a coded image having a size adjusted automatically such that the important area can be seen easily.

According to the sixth aspect of the invention, it is possible to set the coding bit amount of an area detected by the important area detecting means corresponding to the reliability of the detected area by using a quantization value to be a coding parameter calculated by the coding parameter calculating means.

According to the seventh aspect of the invention, it is possible to set the coding bit amount of an area detected by the important area detecting means corresponding to the reliability of the detected area by using an update rate to be a coding parameter calculated by the coding parameter calculating means.

According to the eighth aspect of the invention, it is possible to set the coding bit amount of an area detected by the important area detecting means corresponding to the reliability of the detected area by using a frame skipping threshold to be a coding parameter calculated by the coding parameter calculating means.

According to the ninth aspect of the invention, it is possible to set the coding bit amount of an area detected by the important area detecting means corresponding to the reliability of the detected area by using prefilters having various strengths to be coding parameters calculated by the coding parameter calculating means.

According to the tenth aspect of the invention, it is possible to set the coding bit amount of an area detected by the important area detecting means corresponding to the reliability of the detected area by using a cutout size to be a coding parameter calculated by the coding parameter calculating means.

According to the eleventh aspect of the invention, it is possible to set the coding bit amount of an area detected by the important area detecting means corresponding to the reliability of the detected area by using an area correcting parameter to be a coding parameter calculated by the coding parameter calculating means.

According to the twelfth aspect of the invention, at least two of the coding parameters to be calculated corresponding to the value of the reliability by the important area detecting means are combined, for example, a prefilter and an update rate are combined. Consequently, the choices of the coding parameter can be increased and the picture quality of the important area can be enhanced more properly depending on various manners of the important area and other areas.

According to the thirteenth aspect of the invention, the coding parameter calculating means determines the coding mode of a detected area into motion priority or picture quality priority by using the detection result of the important area detecting means. Consequently, the important area having a motion can be coded to have the smooth motion. If the important area has no motion, the coding is carried out to enhance the picture quality. Thus, a visibility can be enhanced.

According to the fourteenth aspect of the invention, the coding parameter calculating means largely controls the degree of a decrease in the quantization value of a detected area if the value of the reliability of specific area detection is great, and slightly controls the degree of a decrease in the quantization value of the detected area if the reliability is low. Depending on the detection reliability, consequently, a deterioration in a picture quality can be considerably reduced to obtain an enhancement in the picture quality in an area having a higher reliability and a higher probability of an important area. Moreover, the degree of a reduction in the deterioration in the picture quality is decreased in an area having a lower reliability and a lower probability of the important area. Also in the case in which a detection result is deviated from a real important area, consequently, it is possible to prevent the picture quality of a detection error portion in the real important area from being extremely deteriorated.

According to the fifteenth aspect of the invention, the coding parameter calculating means largely controls the degree of an increase in the screen update rate of a detected area if the reliability of specific area detection is higher, and slightly controls the degree of an increase in the screen update rate of the detected area if the reliability is lower. Consequently, the screen update rate can be set to be higher in an area having a higher reliability and a higher probability of an important area. Thus, the coding can be carried out such that the motion of the important area is automatically performed smoothly. To the contrary, the degree of an increase in the screen update rate can be reduced in an area having a lower reliability and a lower probability of the important area. Also in the case in which a detection result is deviated from a real important area, therefore, it is possible to prevent the smoothness of a motion from being extremely reduced in the detection error portion of the real important area.

According to the sixteenth aspect of the invention, the coding parameter calculating means largely controls the degree of an increase in the frame skipping threshold of a detected area so as to carry out a coding skip with difficulty if the reliability of specific area detection is higher, and slightly controls the degree of an increase in the frame skipping threshold of the detected area so as to carry out the coding skip more easily than that in the case of the high reliability if the reliability is lower. In an area having a higher reliability and a higher probability of an important area, thus, a possibility that the coding skip might be carried out is reduced also in the case in which a band is insufficient in the coding. Therefore, it is possible to carry out the coding by maintaining the smoothness of a motion. In an area having a lower reliability and a lower probability of the important area, moreover, the possibility that the coding skip might be carried out is more increased than that in the case of the high reliability. Also in the case in which the band is insufficient and a detection result is deviated from a real important area, therefore, the smoothness of a motion can be prevented from being extremely reduced in the detection error portion of the real important area.

According to the seventeenth aspect of the invention, depending on the reliability of the detection of an important area, the coding parameter calculating means sets a prefilter other than that in the detected area of a specific area to be a low pass filter having a higher cut-off frequency if the reliability is higher and a probability of the important area is higher, and sets the prefilter other than that in the detected area to be a low pass filter having a lower cut-off frequency if the reliability is lower. In an area having a higher possibility of the important area, consequently, a low pass filter having a higher cut-off frequency is provided for the outside of the detected area to reduce high frequency information, thereby saving a code amount. Thus, it is possible to assign a larger code amount to the detected area, resulting in an enhancement in a picture quality. Also in the case in which the reliability is lower and the detected area is shifted from a real important area, moreover, it is possible to prevent a detection error portion in the real important area from becoming an extremely blurred image.

According to the eighteenth aspect of the invention, the coding parameter calculating means sets an area cut out of an input image to be a detected area if the reliability of the detection of an important area is higher, and sets a size cut out of the input image to be a large area including the surroundings of the detected area if the value of the reliability is smaller. In the case in which the reliability is higher and a probability of the important area is higher, therefore, it is possible to faithfully cut out, more enlarge and code the important area. Also in the case in which the reliability is lower and precision in the detection of the important area is lower, moreover, the area including the surroundings of the detected area is cut out. Consequently, it is possible to automatically cut out, enlarge and code the important area without causing a problem that the detection error portion in the real important area is protruded from the cutout area.

According to the nineteenth aspect of the invention, the coding parameter calculating means sets the size correction of a detected area to be smaller if the reliability of specific area detection is higher, and sets the size correction of the detected area to be greater if the reliability is lower. Also in the case in which precision in the detection of the important area is lower and a real important area is shifted from the detected area, consequently, the picture quality of an area including the surroundings of the detected area can be enhanced. Thus, the picture quality of the real important area can be enhanced automatically.

According to the twentieth aspect of the invention, the coding parameter calculating means sets an area cut out of an input image to be a detected area and decreases the quantization value of the detected area if the reliability of specific area detection is higher, and does not cut the detected area out of the input image and decreases the quantization value of the detected area if the reliability is lower. In an area having a higher reliability and a higher probability of an important area, consequently, it is possible to automatically enhance a picture quality and carry out cutout and enlargement, thereby increasing a visibility. In the case in which the reliability is lower, the probability of the important area is lower and the detected area is shifted from a real important area, moreover, only an enhancement in a picture quality can be carried out. Consequently, it is possible to prevent a detection error portion in the real important area from being protruded from the cutout area by the cutout. Thus, it is possible to automatically change the type of an enhancement in a visibility depending on the reliability.

According to the twenty-first aspect of the invention, the coding parameter calculating means sets the coding mode of a detected area into picture quality priority if the size of a detected important area is large, and sets the coding mode of the detected area into motion priority if the size is small. Depending on the size of the important area, consequently, a motion is automatically caused to have priority over a picture quality if the important area is smaller and a deterioration in the picture quality is less remarkable. Thus, coding can be carried out with a smooth motion. In the case in which the important area is larger and the deterioration in the picture quality is more remarkable, furthermore, the picture quality is automatically caused to have priority over the motion. Consequently, it is possible to carry out the coding to maintain a high visibility which is suitable for the size of the important area.

As described above, according to the invention, it is possible to provide a video coding apparatus wherein the picture quality of a detected area can be enhanced in the case in which this area is an original important area, and furthermore, the picture quality of the important area can be maintained to some extent also in the case in which the detected area does not include the original important area, thereby ensuring a visibility without breaking restrictions for coding a video signal in a limited transmission bit rate.

What is claimed is:

1. A video coding apparatus for coding a video signal based on a coding parameter for setting a coding bit amount, comprising:

important area detecting means for detecting, as an important area, a specific area in a displayed image by the video signal for which a preset high visibility is required; and coding parameter calculating means for calculating a coding parameter of the area detected by the important area detecting means;

wherein the important area detecting means calculates a reliability indicative of precision in a detection result of the specific area, the calculated reliability comprising a value of the reliability that represents a degree of the detected area coincidence of the important area, and wherein the coding parameter calculating means calculates the coding parameter of the detected area depending on the value of the reliability which is calculated by the important area detecting means, and further wherein the coding parameter calculating means calculates the coding parameter of the detected area as a function of the value of the reliability using an equation that includes the value of the reliability.

2. The video coding apparatus according to claim 1, wherein a coding parameter on an outside of the detected area is greater than the coding parameter of the detected area and is gradated as growing away from the detected area.

3. The video coding apparatus according to claim 1, wherein the coding parameter of the detected area is a quantization value and the coding parameter calculating means calculates a smaller quantization value for the detected area if the value of the reliability is high, and a larger quantization value for the detected area if the value of the reliability is low.

4. The video coding apparatus according to claim 1, wherein the coding parameter of the detected area is a screen update rate and the coding parameter calculating means greatly controls a degree of an increase in the screen update rate of the detected area if the value of the reliability is high, and slightly controls the degree of the increase in the screen update rate of the detected area if the value of the reliability is low.

5. The video coding apparatus according to claim 1, wherein the coding parameter is a frame skipping threshold and the coding parameter calculating means greatly controls a degree of an increase in the frame skipping threshold of the detected area if the value of the is high, and slightly controls the degree of the increase in the frame skipping threshold of the detected area if the value of the reliability is low.

6. The video coding apparatus according to claim 1, wherein the coding parameter calculating means sets a prefilter of an area other than the detected area to be a low pass filter having a high cut-off frequency if the value of the reliability is high and sets the prefilter to be a low pass filter having a low cut-off frequency if the value of the reliability is low, thereby calculating, as a coding parameter, a prefilter for removing a high frequency component of the video signal.

7. The video coding apparatus according to claim 1, further comprising preprocessing means, wherein the coding parameter is a cutout size of an area to be cut out of an image displayed by the video signal, and the coding parameter calculating means calculates a smaller cutout size if the value of the reliability is high, and a larger cutout size if the value of the reliability is low, and wherein the preprocessing means cuts out a specific area of the image displayed by the video signal or adjusts a cutout area in the displayed image based on the cutout size calculated as the coding parameter.

8. The video coding apparatus according to claim 1, wherein the coding parameter calculating means sets a degree of size correction of the detected area to be low if the value of the reliability is high, and sets the degree of the size correction of the detected area to be high if the value of the reliability is low, thereby calculating, as a coding parameter, an area correcting parameter for changing a size of the detected area.

9. The video coding apparatus according claim 1, wherein the coding parameter calculating means sets, as the area detected by the important area detecting means, an area to be cut out of an image displayed by the video signal and decreases a quantization value of the detected area if the value of the reliability is high, and does not cut out the detected area from the image but decreases the quantization value of the detected area if the value of the reliability is small value, thereby calculating the quantization value and cutout area information as a coding parameter.

10. The video coding apparatus according claim 1, wherein the coding parameter is a coding mode, and the coding parameter calculating means sets the coding mode of the detected area into picture priority if a size of a specific area detected by the important area detecting means is large, and sets the coding mode of the detected area into motion priority if the size of the specific area is small.

11. A video coding apparatus for coding a video signal based on a coding parameter for setting a coding bit amount, comprising:

an important area detector for detecting an important area in a displayed image of the video signal and calculating a reliability that represents precision in detecting the important area, the calculated reliability comprising a value of the reliability that represents a degree of the detected area coincidence of the important area, wherein the important area is an area requiring a preset high visibility; and a coding parameter calculator for calculating a coding parameter of the important area based on said reliability, wherein the coding parameter calculator calculates the coding parameter of the important area as a function of the value of the reliability using an equation that includes the value of the reliability.

* * * * *